United States Patent
Withrow et al.

(10) Patent No.: US 10,915,612 B2
(45) Date of Patent: Feb. 9, 2021

(54) AUTHENTICATED PRODUCTION

(71) Applicant: Alitheon, Inc., Redmond, WA (US)

(72) Inventors: Justin Lynn Withrow, Redmond, WA (US); David Justin Ross, Redmond, WA (US)

(73) Assignee: ALITHEON, INC., Redmond, WA (US)

( * ) Notice: Subject to any disclaimer, the term of this patent is extended or adjusted under 35 U.S.C. 154(b) by 195 days.

(21) Appl. No.: 15/641,157

(22) Filed: Jul. 3, 2017

(65) Prior Publication Data

US 2018/0012008 A1   Jan. 11, 2018

Related U.S. Application Data

(60) Provisional application No. 62/358,506, filed on Jul. 5, 2016.

(51) Int. Cl.
*G06F 21/32* (2013.01)
*G06K 9/00* (2006.01)
(Continued)

(52) U.S. Cl.
CPC .......... *G06F 21/32* (2013.01); *B29C 64/386* (2017.08); *B33Y 50/00* (2014.12); *B41J 29/38* (2013.01);
(Continued)

(58) Field of Classification Search
CPC ..... G06F 21/32; G06F 16/5854; B33Y 50/00; B29C 64/386; B41J 29/38;
(Continued)

(56) References Cited

U.S. PATENT DOCUMENTS 4,218,674 A   8/1980   Brosow
4,423,415 A   12/1983  Goldman
(Continued)

FOREIGN PATENT DOCUMENTS

DE   102006 005927 A1   8/2007
EP   0439669              8/1991
(Continued)

OTHER PUBLICATIONS

Extended European Search Report, dated Oct. 26, 2017, for European Application No. 17179894.5-1871, 8 pages.
(Continued)

*Primary Examiner* — Yonas A Bayou
(74) *Attorney, Agent, or Firm* — Cozen O'Connor

(57) ABSTRACT

Apparatuses and methods associated with authenticated production are disclosed herein. In embodiments, a digital fingerprint processor may be configured to: identify an activation of at least one of the one or more machines to attempt to produce or manufacture at least one of physical product or physical manufacture; responsive to completion of one or more operations associated with the activation by the one or more machines, acquire digital image data of a portion of a physical object on or inside the one or more machines; analyze the digital image data to form a digital fingerprint of the physical object, wherein the digital fingerprint is responsive to structure of the physical object; and store the digital fingerprint in a database record of the database system. Other embodiments may be disclosed or claimed.

23 Claims, 13 Drawing Sheets

(51) Int. Cl.
  *B41J 29/38* (2006.01)
  *G06F 16/583* (2019.01)
  *G06Q 50/04* (2012.01)
  *G06Q 30/00* (2012.01)
  *B33Y 50/00* (2015.01)
  *B29C 64/386* (2017.01)

(52) U.S. Cl.
  CPC ..... *G06F 16/5854* (2019.01); *G06K 9/00013* (2013.01); *G06K 9/00067* (2013.01); *G06K 9/00087* (2013.01); *G06Q 30/0185* (2013.01); *G06Q 50/04* (2013.01); *G06K 2209/27* (2013.01); *Y02P 90/30* (2015.11)

(58) Field of Classification Search
  CPC ........... G06K 9/00013; G06K 9/00087; G06K 2209/27; G06Q 30/0185; G06Q 50/04; Y02P 90/30
  See application file for complete search history.

(56) References Cited

U.S. PATENT DOCUMENTS

| | | |
|---|---|---|
| 4,677,435 A | 6/1987 | Causse D'Agraives |
| 4,700,400 A | 10/1987 | Ross |
| 4,921,107 A | 5/1990 | Hofer |
| 5,031,223 A | 7/1991 | Rosenbaum |
| 5,079,714 A | 1/1992 | Manduley |
| 5,393,939 A | 2/1995 | Nasuta, Jr. |
| 5,422,821 A | 6/1995 | Allen |
| 5,514,863 A | 5/1996 | Williams |
| 5,518,122 A | 5/1996 | Tilles |
| 5,521,984 A * | 5/1996 | Denenberg ................ G07F 7/08 382/209 |
| 5,703,783 A | 12/1997 | Allen et al. |
| 5,719,939 A | 2/1998 | Tel |
| 5,734,568 A | 3/1998 | Borgendale |
| 5,745,590 A | 4/1998 | Pollard |
| 5,883,971 A | 3/1999 | Bolle |
| 5,923,848 A | 7/1999 | Goodhand |
| 5,974,150 A | 10/1999 | Kaish |
| 6,205,261 B1 | 3/2001 | Goldberg |
| 6,246,794 B1 | 6/2001 | Kagehiro |
| 6,292,709 B1 | 9/2001 | Uhl |
| 6,327,373 B1 | 12/2001 | Yura |
| 6,343,327 B2 | 1/2002 | Daniels, Jr. |
| 6,360,001 B1 | 3/2002 | Berger |
| 6,370,259 B1 | 4/2002 | Hobson |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga |
| 6,539,098 B1 | 3/2003 | Baker |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston |
| 6,741,724 B1 | 5/2004 | Bruce |
| 6,768,810 B2 | 7/2004 | Emanuelsson |
| 6,778,703 B1 | 8/2004 | Zlotnick |
| 6,805,926 B2 | 10/2004 | Cote |
| 6,816,602 B2 | 11/2004 | Coffelt |
| 6,829,369 B2 | 12/2004 | Poulin |
| 6,961,466 B2 | 11/2005 | Imagawa et al. |
| 6,985,926 B1 | 1/2006 | Ferlauto |
| 7,016,532 B2 | 3/2006 | Boncyk |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant |
| 7,152,047 B1 | 12/2006 | Nagel |
| 7,171,049 B2 | 1/2007 | Snapp |
| 7,204,415 B2 | 4/2007 | Payne |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce |
| 7,477,780 B2 | 1/2009 | Boncyk |
| 7,518,080 B2 | 4/2009 | Amato |
| 7,602,938 B2 | 10/2009 | Proloski |
| 7,674,995 B2 | 3/2010 | Desprez |
| 7,676,433 B1 | 3/2010 | Ross et al. |
| 7,680,306 B2 | 3/2010 | Boutant |
| 7,720,256 B2 | 5/2010 | Desprez |
| 7,726,457 B2 | 6/2010 | Maier et al. |
| 7,726,548 B2 | 6/2010 | deLaVergne |
| 7,748,029 B2 | 6/2010 | Ross |
| 7,822,263 B1 | 10/2010 | Proloski |
| 7,834,289 B2 | 11/2010 | Orbke |
| 7,853,792 B2 | 12/2010 | Cowburn |
| 8,022,832 B2 | 9/2011 | Vogt |
| 8,032,927 B2 | 10/2011 | Ross |
| 8,108,309 B2 | 1/2012 | Tan |
| 8,180,174 B2 | 5/2012 | Di Venuto |
| 8,180,667 B1 | 5/2012 | Baluja |
| 8,194,938 B2 | 6/2012 | Wechsler |
| 8,316,418 B2 | 11/2012 | Ross |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette |
| 8,437,530 B1 | 5/2013 | Mennie et al. |
| 8,457,354 B1 | 6/2013 | Kolar et al. |
| 8,477,992 B2 | 7/2013 | Paul |
| 8,520,888 B2 | 8/2013 | Spitzig |
| 8,526,743 B1 | 9/2013 | Campbell |
| 8,774,455 B2 | 7/2014 | Elmenhurst |
| 9,031,329 B1 | 5/2015 | Farid |
| 9,058,543 B2 | 6/2015 | Campbell |
| 9,152,862 B2 | 10/2015 | Ross |
| 9,170,654 B2 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,714 B2 | 5/2016 | Freeman et al. |
| 9,361,596 B2 | 6/2016 | Ross et al. |
| 9,558,463 B2 | 1/2017 | Ross et al. |
| 9,646,206 B2 | 5/2017 | Ross et al. |
| 10,199,886 B2 | 2/2019 | Li et al. |
| 10,540,664 B2 | 1/2020 | Ross et al. |
| 2001/0010334 A1 | 8/2001 | Park |
| 2001/0054031 A1 | 12/2001 | Lee |
| 2002/0015515 A1 | 2/2002 | Lichtermann |
| 2002/0073049 A1 | 6/2002 | Dutta |
| 2002/0168090 A1 | 11/2002 | Bruce |
| 2003/0015395 A1 | 1/2003 | Hallowell et al. |
| 2003/0046103 A1 | 3/2003 | Amato |
| 2003/0091724 A1 | 5/2003 | Mizoguchi |
| 2003/0120677 A1 | 6/2003 | Vernon |
| 2003/0138128 A1 * | 7/2003 | Rhoads ................ G07F 7/1008 382/100 |
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 * | 11/2003 | Smith ................ G06K 9/4661 382/100 |
| 2004/0027630 A1 | 2/2004 | Lizotte |
| 2004/0101174 A1 | 5/2004 | Sato et al. |
| 2004/0112962 A1 | 6/2004 | Farrall |
| 2004/0218791 A1 | 11/2004 | Jiang |
| 2004/0218801 A1 | 11/2004 | Houle |
| 2005/0007776 A1 | 1/2005 | Monk et al. |
| 2005/0038756 A1 * | 2/2005 | Nagel .................... B42D 25/29 705/76 |
| 2005/0065719 A1 | 3/2005 | Khan |
| 2005/0086256 A1 | 4/2005 | Owens |
| 2005/0111618 A1 | 5/2005 | Sommer et al. |
| 2005/0119786 A1 | 6/2005 | Kadaba |
| 2005/0125360 A1 * | 6/2005 | Tidwell ................ G06Q 20/042 705/65 |
| 2005/0131576 A1 | 6/2005 | DeLeo |
| 2005/0137882 A1 | 6/2005 | Cameron et al. |

(56) References Cited

U.S. PATENT DOCUMENTS

| | | |
|---|---|---|
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce |
| 2005/0257064 A1 | 11/2005 | Boutant |
| 2005/0289061 A1 | 12/2005 | Kulakowski et al. |
| 2006/0010503 A1 | 1/2006 | Inoue |
| 2006/0083414 A1 | 4/2006 | Neumann |
| 2006/0109520 A1 | 5/2006 | Gossaye et al. |
| 2006/0131518 A1 | 6/2006 | Ross |
| 2006/0177104 A1 | 8/2006 | Prokoski |
| 2006/0253406 A1 | 11/2006 | Caillon |
| 2007/0071291 A1 | 3/2007 | Yumoto et al. |
| 2007/0085710 A1 | 4/2007 | Bousquet |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0269043 A1 | 11/2007 | Launay et al. |
| 2007/0282900 A1 | 12/2007 | Owens |
| 2008/0008377 A1* | 1/2008 | Andel .................. G06K 9/2063 382/141 |
| 2008/0011841 A1 | 1/2008 | Self |
| 2008/0128496 A1 | 6/2008 | Bertranou et al. |
| 2008/0130947 A1 | 6/2008 | Ross |
| 2008/0219503 A1 | 9/2008 | DiVenuto |
| 2008/0250483 A1 | 10/2008 | Lee |
| 2008/0255758 A1 | 10/2008 | Graham |
| 2008/0272585 A1 | 11/2008 | Conard |
| 2008/0290005 A1 | 11/2008 | Bennett et al. |
| 2008/0294474 A1 | 11/2008 | Furka |
| 2009/0028379 A1 | 1/2009 | Belanger |
| 2009/0057207 A1 | 3/2009 | Orbke |
| 2009/0106042 A1 | 4/2009 | Maytal |
| 2009/0134222 A1 | 5/2009 | Ikeda |
| 2009/0154778 A1 | 6/2009 | Lei |
| 2009/0157733 A1 | 6/2009 | Kim |
| 2009/0223099 A1 | 9/2009 | Versteeg |
| 2009/0232361 A1 | 9/2009 | Miller |
| 2009/0245652 A1 | 10/2009 | Bastos dos Santos |
| 2009/0271029 A1 | 10/2009 | Doutre |
| 2009/0287498 A2 | 11/2009 | Choi |
| 2009/0307005 A1 | 12/2009 | O'Martin |
| 2010/0027834 A1 | 2/2010 | Spitzig |
| 2010/0070527 A1 | 3/2010 | Chen |
| 2010/0104200 A1 | 4/2010 | Baras |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette |
| 2010/0286815 A1* | 11/2010 | Zimmermann ........... B07C 3/00 700/223 |
| 2011/0026831 A1 | 2/2011 | Perronnin |
| 2011/0064279 A1 | 3/2011 | Uno |
| 2011/0081043 A1 | 4/2011 | Sabol et al. |
| 2011/0091068 A1 | 4/2011 | Stuck |
| 2011/0161117 A1 | 6/2011 | Busque et al. |
| 2011/0188709 A1 | 8/2011 | Gupta |
| 2011/0194780 A1 | 8/2011 | Lie |
| 2011/0235920 A1 | 9/2011 | Iwamoto |
| 2011/0267192 A1 | 11/2011 | Goldman et al. |
| 2012/0042171 A1 | 2/2012 | White |
| 2012/0089639 A1 | 4/2012 | Wang |
| 2012/0130868 A1 | 5/2012 | Loken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Dayer et al. |
| 2012/0250945 A1 | 10/2012 | Peng |
| 2013/0212027 A1* | 8/2013 | Sharma ................. G07D 7/2033 705/71 |
| 2013/0214164 A1 | 8/2013 | Zhang et al. |
| 2013/0273968 A1 | 10/2013 | Rhoads et al. |
| 2013/0277425 A1 | 10/2013 | Sharma |
| 2013/0284803 A1 | 10/2013 | Wood |
| 2014/0032322 A1 | 1/2014 | Schwieger et al. |
| 2014/0140570 A1 | 5/2014 | Ross |
| 2014/0140571 A1 | 5/2014 | Elmenhurst |
| 2014/0184843 A1 | 7/2014 | Campbell |
| 2014/0201094 A1 | 7/2014 | Herrington et al. |
| 2014/0270341 A1 | 9/2014 | Elmenhurst |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1* | 3/2015 | Ross ...................... G06K 9/52 713/176 |
| 2015/0078629 A1 | 3/2015 | Gottemukkula |
| 2015/0086068 A1 | 3/2015 | Mulhearn |
| 2015/0117701 A1* | 4/2015 | Ross .................... G06K 9/3216 382/100 |
| 2015/0127430 A1 | 5/2015 | Hammer, III |
| 2015/0248587 A1 | 9/2015 | Oami et al. |
| 2015/0294189 A1 | 10/2015 | Benhimane et al. |
| 2015/0309502 A1* | 10/2015 | Breitgand ........... G06Q 30/0185 700/98 |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0117631 A1 | 4/2016 | McCloskey et al. |
| 2016/0162734 A1 | 6/2016 | Ross |
| 2016/0180546 A1 | 6/2016 | Kim et al. |
| 2016/0189510 A1 | 6/2016 | Hutz |
| 2016/0335520 A1 | 11/2016 | Ross |
| 2017/0004444 A1 | 1/2017 | Krasko et al. |
| 2017/0032285 A1 | 2/2017 | Sharma et al. |
| 2017/0132458 A1 | 5/2017 | Short et al. |
| 2017/0243230 A1 | 8/2017 | Ross |
| 2017/0243231 A1 | 8/2017 | Ross |
| 2017/0243232 A1 | 8/2017 | Ross |
| 2017/0243233 A1 | 8/2017 | Ross |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0372327 A1 | 12/2017 | Withrow |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034518 A1 | 1/2019 | Liu et al. |
| 2019/0034694 A1 | 1/2019 | Ross |
| 2019/0102873 A1 | 4/2019 | Wang et al. |
| 2019/0228174 A1 | 7/2019 | Withrow et al. |
| 2019/0287118 A1 | 9/2019 | Ross et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Ross et al. |
| 2020/0334689 A1 | 10/2020 | Ross et al. |
| 2020/0349379 A1 | 11/2020 | Ross |
| 2020/0356772 A1 | 11/2020 | Withrow et al. |

FOREIGN PATENT DOCUMENTS

| | | |
|---|---|---|
| EP | 759596 A2 | 2/1997 |
| EP | 1016548 A2 | 7/2000 |
| EP | 1719070 | 4/2006 |
| EP | 2 107 506 A1 | 10/2009 |
| EP | 2166493 | 3/2010 |
| EP | 2195621 B1 | 6/2010 |
| EP | 2866193 A1 | 4/2015 |
| EP | 2257909 | 5/2015 |

(56) References Cited

FOREIGN PATENT DOCUMENTS

| | | |
|---|---|---|
| EP | 2869240 A2 | 5/2015 |
| EP | 2869241 A2 | 5/2015 |
| EP | 3208744 A1 | 8/2017 |
| EP | 3249581 | 11/2017 |
| EP | 3270342 A1 | 1/2018 |
| EP | 3435287 A2 | 1/2019 |
| GB | 2097979 A | 11/1982 |
| GB | 2482127 | 1/2012 |
| JP | 61-234481 A | 10/1986 |
| JP | 2007-213148 | 8/2007 |
| KR | 20120009654 A | 2/2012 |
| WO | WO 2005/086616 | 9/2005 |
| WO | 2006/038114 A1 | 4/2006 |
| WO | 2007/031176 A1 | 3/2007 |
| WO | WO 2007/028799 | 3/2007 |
| WO | 2007/071788 A1 | 6/2007 |
| WO | 2007/090437 A1 | 8/2007 |
| WO | WO 2007/144598 | 12/2007 |
| WO | 2009/030853 A1 | 3/2009 |
| WO | WO 2009/089126 | 7/2009 |
| WO | WO 2009/115611 | 9/2009 |
| WO | WO 2010/018464 | 2/2010 |
| WO | 2012/145842 A1 | 11/2010 |
| WO | 2013/126221 A1 | 8/2013 |
| WO | WO 2013/173408 | 11/2013 |
| WO | 2015/004434 A1 | 1/2015 |
| WO | WO 2016/081831 | 5/2016 |

OTHER PUBLICATIONS

Clifton Smith; "Fireball: A Forensic Ballistic Imaging System"; Security Science, Edith Cowan University; IEEE; 1997.
Huang, et al., "An Online Ballistics Imaging System for Firearm Identification"; 2010 2nd International Conference on Signal Processing Systems (ICSPS).
Leng, et al., "A Novel Binarization Algorithms for Ballistics Imaging Systems"; 2010 3rd International Congress on Image and Signal Processing (CISP2010).
Li; "Firearm Identification System Based on Ballistics Image Processing"; 2008 Congress on Image and Signal Processing.
NCOA Link at http://ribbs.usps.gov/ncoalink/ncoalink_print.htm; dated May 27, 2009; 3 pages.
Online NCOALink Processing Acknowledgement Form (PAF) Released by Lorton Data; http://us.generation-nt.com/online-ncoalink-processing-acknowledgement-form-paf-released-by-press-1567191.html; release dated Jun. 2, 2009; 1 page.
United States Postal Service Publication 28 "Postal Addressing Standards", dated Jul. 2008; text plus Appendix A only; 55 pages.
Farid, "Digital Image Forensics", Dartmouth CS 89/189, Sprint 2013; 199 pages.
United States Postal Service, "NCOALink Systems", http://www.usps.com/ncsc/addressservices/moveupdate/changeaddress.htm, website accessed Jun. 23, 2010, 2 pages.
Schwabe Williamson & Wyatt, Pc—Listing of Related Cases; dated Sep. 16, 2017; 2 pages.
Boa et al., "Local Feature based Multiple Object Instance Identification using Scale and Rotation Invariant Implicit Shape Model," 12th Asian Conference on Computer Vision, Singapore, Singapore, Nov. 1-5, 2014, pp. 600-614.
Beekhof et al., "Secure Surface Identification Codes," Proceeding of the SPIE 6819: Security Forensics, Steganography, and Watermarking of Multimedia Contents X:68190D, 2008. (12 pages).
Buchanan et al., "Fingerprinting documents and packaging," Nature 436 (7050): 475, 2005.
Di Paola et al., "An Autonomous Mobile Robotic System for Surveillance of Indoor Environments," International Journal of Advanced Robotic Systems 7(1): 19-26, 2010.

Fischler et al., "Random Sample Consensus: A Paradigm for Model Fitting with Applications to Image Analysis and Automated Cartography," Communication of the ACM 24(6); 381-395, 1981.
Kartik et al., "Security System with Face Recognition, SMS Alert and Embedded Network Video Monitoring Terminal," International Journal of Security, Privacy and Trust Management 2(5):9-19, 2013.
Li, "Image Processing for the Positive Identification of Forensic Ballistics Specimens," Proceedings of the 6th International Conference of Information Fusion, Cairns, Australia, Jul. 8-11, 2003, pp. 1494-1498.
Maddern et al., "Illumination Invariant Imaging: Applications in Robust Vision-based Localization, Mapping and Classification for Autonomous Vehicles," IEEE International Conference on Robotics and Automation, Hong Kong, China, May 31-Jun. 7, 2014, 2014, 8 pages.
Matsumoto et al., "Nano-artifact metrics based on random collapse of resist," Scientific Reports 4:6142, 2014 (5 pages).
Rublee et al., "ORB: an efficient alternative to SIFT or SURF," IEEE International Conference on Computer Vision, Barcelona, Spain, Nov. 6-13, 2011, 8 pages.
Schneider et al., "A Robust Content Based Digital Signature for Image Authentication," Proceeding of the International Conference on Image Processing Lausanne, Switzerland, Sep. 19, 1996, pp. 227-230.
Shi et al., "Smart Cameras: Fundamentals and Classification," Chapter 2, Belbachir (ed.), Smart Cameras, Springer, New York, New York, USA 2010, pp. 19-34.
Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.
Veena et al., "Automatic Theft Security System (Smart Surveillance Camera)," Computer Science & Information Technology 3:75-87, 2013.
Ebay, "eBay Launches Must-Have IPhone App Red Laser 3.0" published Nov. 18, 2011; https://www.ebayinc.com/stories/news/ebay-launches-must-have-iphone-app-redlaser-30/, downloaded Mar. 21, 2019, 7 pages).
Shields, "How to Shop Savvy With Red Laser," published online on Mar. 22, 2010; https://iphone.appstornn.net/reviews/lifestyle/how-to-shop-savvy-with-redlaser/, downloaded Mar. 22, 2010, 8 pages).
Entrupy.com Website History, Wayback Machine; https://web.archive.org/web/20160330060808/https://www.entrupy.com/; Mar. 30, 2016 (Year: 2016), 2 pages.
Anonymous, "Intrinsic Characteristics for Authentication" & "AlpVision Advances Security Through Digital Technology," Authentication News vol. 12, (No. 9) pp. 2, 7 and 8, dated Sep. 2006, 3 pages total.
Mistry et al., "Comparison of Feature Detection and Matching Approaches: SIFT and SURF," Global Research and Development Journal for Engineering, vol. 2, Issue 4, Mar. 2017, 8 pages.
Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.
Drew, M. S., et al., "Sharpening from Shadows: Sensor Transforms for Removing Shadows using a Single Image," Color and Imaging Conference, vol. 5, Society for Imaging Science and Technology, 2009, pp. 267-271.
Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.
Cavoukian et al.; "Biometric Encryption: Technology for Strong Authentication, Security and Privacy, Office of the information and Privacy Commissioner, Toronto, Ontario, Canada," 2008, in WE, International Federation lot Information Processing, vol. 261; Policies and Research in Identity Management; Eds. E. de Leeuw. Fischer-Hübner, S. Tseng, J., Barking, J.: (Boston: Springer), pp. 57-77 (21 pages).

\* cited by examiner

FIG. 6 Sample Authentication Regions

AUTHENTICATED PRODUCTION

PRIORITY CLAIM

This application is a non-provisional of, and claims priority pursuant to 35 U.S.C. § 119(e) (2012) to U.S. provisional application No. 62/358,506 filed Jul. 5, 2016, hereby incorporated by reference as though fully set forth.

COPYRIGHT NOTICE

COPYRIGHT © 2016-2017 Alitheon, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 C.F.R. § 1.71(d) (2017).

TECHNICAL FIELD

The present disclosure relates to the field of centralized databases storing digital fingerprints of objects that enable enhanced security, rapid searching, and high reliability. Other aspects include methods and apparatus to identify, track, and authenticate physical objects utilizing a suitable database.

BACKGROUND

Many different approaches are known to uniquely identify and authenticate objects, including labeling and tagging strategies using serial numbers, bar codes, holographic labels, RFID tags, and hidden patterns using security inks or special fibers. All these methods can be duplicated, and many add substantial costs to the production of the objects sought to be protected. Physical labels and tags are also themselves at risk of being lost, stolen, or counterfeited.

SUMMARY OF THE PRESENT DISCLOSURE

The following is a summary of the present disclosure in order to provide a basic understanding of some features and context. This summary is not intended to identify key/critical elements of the disclosure or to delineate the scope of the disclosure. Its sole purpose is to present some concepts of the present disclosure in a simplified form as a prelude to a more detailed description that is presented later.

There are many known approaches to establishing or reestablishing the authenticity of an object, including secure supply chains, expert assessment, and counterfeit detection. With the growth, however, of digital production (for example on a 3-D printer) and the ease of copying the digital files that drive such production, current production methods have become less secure. What is lacking in current methods, and is provided by the present disclosure, is the integration of the authentication and production processes into a single secure process. In embodiments, a digital fingerprint processor may be configured to: identify an activation of at least one of the one or more machines to attempt to produce or manufacture at least one of physical product or physical manufacture; responsive to completion of one or more operations associated with the activation by the one or more machines, acquire digital image data of a portion (e.g., an entire portion or some portion) of a physical object on or inside the one or more machines; analyze the digital image data to form a digital fingerprint of the physical object, wherein the digital fingerprint is responsive to structure of the physical object; and store the digital fingerprint in a database record of the database system.

Additional aspects and advantages of this disclosure will be apparent from the following detailed description of preferred embodiments, which proceeds with reference to the accompanying drawings.

BRIEF DESCRIPTION OF THE DRAWINGS

In order to describe the manner in which the above-recited and other advantages and features of the present disclosure can be obtained, a more particular description follows by reference to the specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF PREFERRED EMBODIMENTS

Figure 1A:
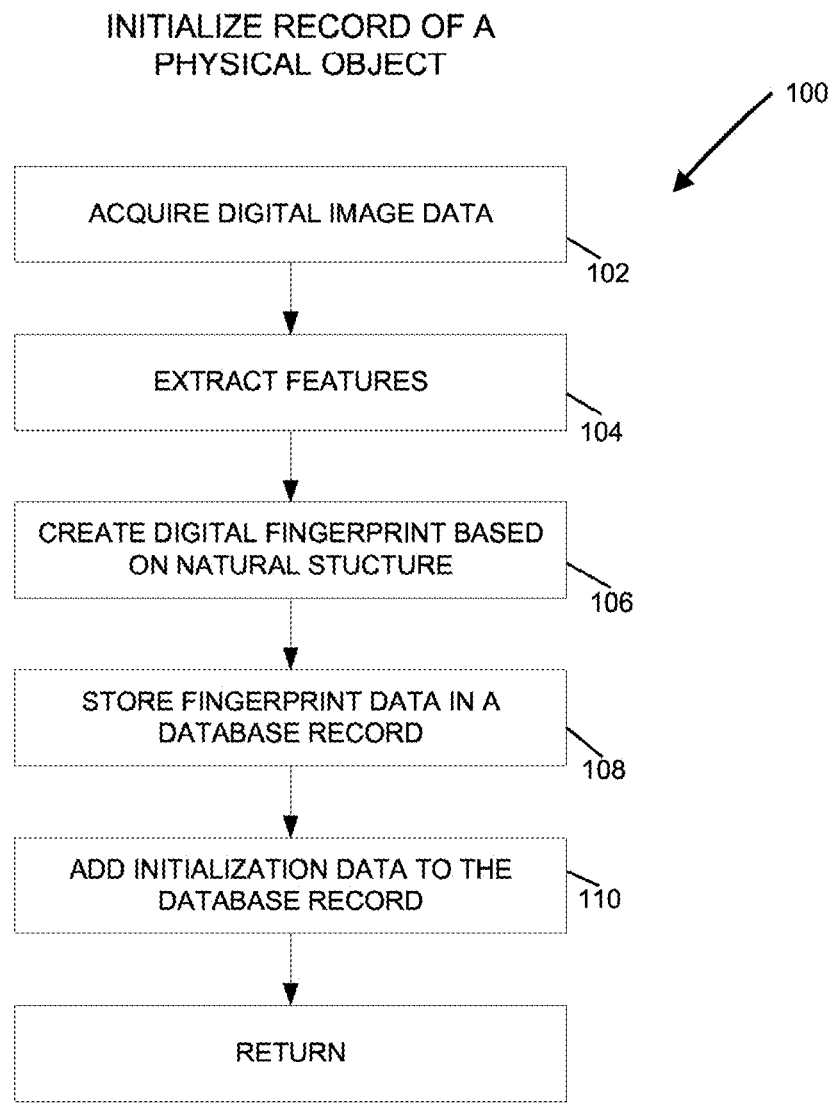
FIG. 1A is a simplified flow diagram illustrating a method for creating and recording a digital fingerprint of an object in a database.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first machine could be termed a second machine, and, similarly, a second machine could be termed a first machine, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed objects. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The methods described in the present disclosure enable the identification of an object without the need for attaching or associating physical tags or identifying materials with the object. A system does this by creating a unique digital signature for the object, which is referred to as a digital fingerprint. Digital fingerprinting utilizes the structure of the object, including random and deliberate features created during the manufacturing or use of the object, to generate a unique digital signature for that object similar to the way in which a human fingerprint references the friction ridges on a finger. Also, like a human fingerprint, the digital fingerprint can be stored and retrieved to identify objects when they are encountered at a later date.

Eliminating the need to add tags or any physical modifications to the object offers a number of advantages to manufacturers, distributors, sellers, and owners of goods. Forgoing the addition of physical identifiers reduces the cost of manufacturing and is more secure than physical tagging. Moreover, physical identifiers can be lost, modified, stolen, duplicated, or counterfeited whereas digital fingerprints cannot.

Unlike prior art approaches that simply utilize a comparison of pixels, a system in accordance with the present disclosure utilizes the extraction of features to identify and authenticate objects. Feature extraction enables users to take a large amount of information and reduce it to a smaller set of data points that can be processed more efficiently. For example, a large digital image that contains tens of thousands of pixels may be reduced to a few locations of interest that can be used to identify an object. This reduced set of data is called a digital fingerprint. This digital fingerprint contains a set of fingerprint features or locations of interest which are stored as feature vectors. Feature vectors make image processing more efficient and reduce storage requirements as the entire image need not be stored in the database, only the feature vectors need to be stored. Examples of feature extraction algorithms include but are not limited to edge detection, corner detection, blob detection, wavelet features, Gabor, gradient and steerable output filter histograms, scale-invariant feature transformation, active contours, shape contexts, and parameterized shapes.

While the most common applications of the system may be in the authentication of manufactured goods and documents, the system is designed to be applicable to any object that can be identified, characterized, quality tested, or authenticated with a digital fingerprint. These include but are not limited to mail pieces, parcels, art, coins, currency, precious metals, gems, jewelry, apparel, mechanical parts, consumer goods, integrated circuits, firearms, pharmaceuticals, and food and beverages. Here the term "system" is used in a broad sense, including the methods of the present disclosure as well as apparatus arranged to implement such methods.

Scanning

In this application, the term "scan" is used in the broadest sense, referring to any and all means for capturing an image or set of images, which may be in digital form or transformed into digital form. Images may, for example, be two dimensional, three dimensional, or in the form of a video. Thus a "scan" may refer to an image (or digital data that defines an image) captured by a scanner, a camera, a specially adapted sensor or sensor array (such as a CCD array), a microscope, a smartphone camera, a video camera, an x-ray machine, a sonar, an ultrasound machine, a microphone (or other instruments for converting sound waves into electrical energy variations), etc. Broadly, any device that can sense and capture either electromagnetic radiation or mechanical wave that has traveled through an object or reflected off an object or any other means to capture surface or internal structure of an object is a candidate to create a "scan" of an object. Various means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure.

Authenticating

In this application, different forms of the words "authenticate" and "authentication" will be used broadly to describe both authentication and attempts to authenticate which comprise creating a digital fingerprint of the object. Therefore, "authentication" is not limited to specifically describing successful matching of inducted objects or generally describing the outcome of attempted authentications. As one example, a counterfeit object may be described as "authenticated" even if the "authentication" fails to return a matching result. In another example, in cases where unknown objects are "authenticated" without resulting in a match and the authentication attempt is entered into a database for subsequent reference the action described as "authentication" or "attempted authentication" may also, post facto, also be properly described as an "induction". An authentication of an object may refer to the authentication of an entire object or of a portion of an object.

Authentication Regions

Because digital fingerprinting works with many different types of objects, it may be useful to define what regions of digital images of objects are to be used for the extraction of features for authentication purposes. The chosen regions may vary for different classes of objects. In some embodiments, a chosen region may be the image of the entire object; in other embodiments chosen regions may be one or more sub-regions of the image of the object.

For instance, in the case of a photograph, a digital image of the entire photograph may be chosen for feature extraction. Each photograph is different and there may be unique feature information anywhere in a photograph. In such a case, the authentication region may be the entire photograph.

In some embodiments, multiple regions may be used for fingerprinting. In some examples, there may be several regions where significant variations take place among different similar objects that need to be distinguished while, in the same objects, there may be regions of little significance. In other examples, a template may be used (see FIG. 6) to define regions of interest, including elimination of regions of little interest.

In one embodiment, an object, such as a bank note, may be deemed authenticated if a few small arbitrary regions scattered across the surface are fingerprinted, possibly combined with one or more recognitions of, for example, the contents of a region signifying the value of the bank note or one containing the bank note serial number. In such examples, the fingerprints of any region (along with sufficient additional information to determine the bank note value and its purported identity) may be considered sufficient to establish the authenticity of the bill. In some embodiments, multiple fingerprinted regions may be referenced in cases where one or more region may be absent from an object (through, for example, tearing) when, for example, a bank note is presented for authentication. In other embodiments, however, all regions of an object may need to be authenticated to ensure an object is both authentic and has not been altered.

Figure 6:
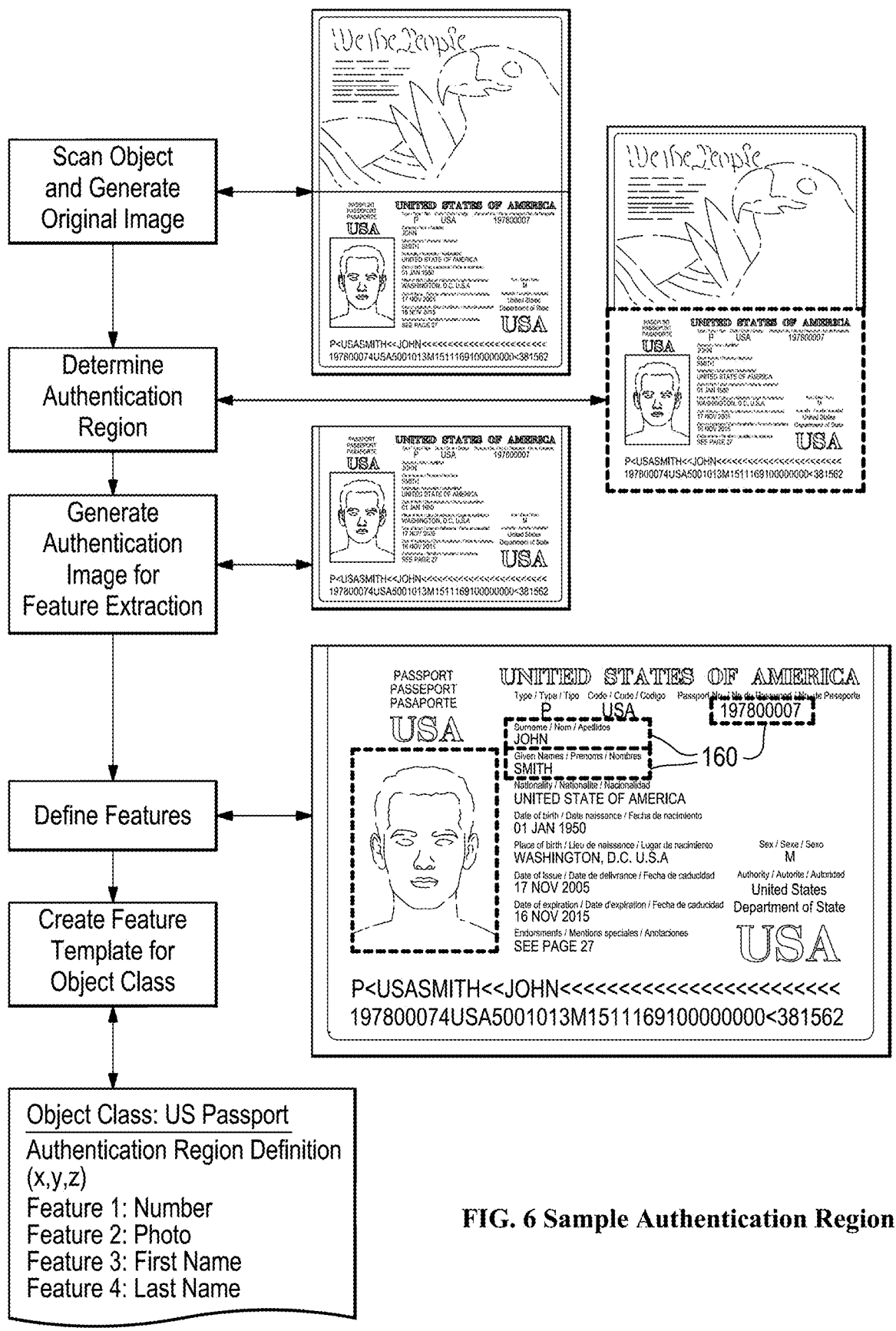
FIG. 6 illustrates an example of authentication region and object feature definition for a U.S. passport.

In one embodiment, a passport may provide an example of feature extractions from multiple authentication regions; see FIG. 6. In the case of a passport, features chosen for authentication may be extracted from regions containing specific identification information such as the passport number, the recipient name, the recipient photo, etc., as illustrated in FIG. 6. In some examples, a user may define a feature template specifying the regions whose alteration from the original would invalidate the passport, such as the photo, identifying personal data, or other regions considered important by the user.

In some embodiments, an ability to define and store optimal authentication regions for classes of objects may offer benefits to a user. In some embodiments, it may be preferable to scan limited regions of objects rather than to scan entire objects. For instance, in the case of an article of designer clothing, scanning a clothing label may be preferable to scanning an entire garment. Further, defining such regions may enable detection of partial alteration of an object.

Once an authentication region is defined, specific applications may be created for different markets or classes of objects that may assist users in locating and scanning an optimal authentication region. In some embodiments, for example when utilizing a mobile device, a location box and crosshairs may automatically appear in the viewfinder of a smartphone camera application, to help the user center the camera on an authentication region, and automatically lock onto a region and complete a scan when the device is focused on an appropriate area. It should be noted that, although some examples suggested above are two-dimensional objects (passport, bank note), the present disclosure is fully applicable to three-dimensional objects as well. As previously noted, scanning may be of any kind, including 2-D, 3-D, stereoscopic, HD, etc. and is not limited to the use of visible light or to the use of light at all (as previously noted, sonar and ultrasound are, for example, appropriate scanning technologies).

In some embodiments, objects may have permanent labels or other identifying information attached to them. In addition to the objects themselves, these attachments may also be referenced as features for digital fingerprinting, particularly where the label or other identifying information becomes a permanent part of the object. In one example, a permanent label may be used as an authentication region for the object to which it is affixed. In another example, a label may be used in conjunction with the object itself to create a fingerprint of multiple authentication regions referencing both a label and an object to which the label is affixed.

In one example, wine may be put into a glass bottle and a label affixed to the bottle. Since it is possible that a label may be removed and re-applied elsewhere merely using the label itself as an authentication region may not be sufficient. In this case the authentication region may be defined so as to include both a label and a substrate it is attached to—in this example some portion of a label and some portion of a glass bottle. This "label and substrate" approach may be useful in defining authentication regions for many types of objects, such as various types of goods and associated packaging. In other instances, authentication may reveal changes in the relative positions of some authentication regions such as in cases where a label has been moved from its original position, which may be an indication of tampering or counterfeiting. If an object has "tamper-proof" packaging, this may also be included in the authentication region.

In some embodiments, multiple authentication regions may be chosen from which to extract unique features. In a preferred embodiment, multiple authentication regions may be selected to enable the separate authentication of one or more components or portions of an object. For example, in one embodiment, features may be extracted from two different parts of a firearm. Both features may match the original firearm but since it is possible that both parts may have been removed from the original firearm and affixed to a weapon of different quality, it may also be useful to determine whether the relative positions of the parts have changed. In other words, it may be helpful to determine that the distance (or other characteristics) between Part A's authentication region and Part B's authentication region remains consistent with the original feature extraction. If the positions of Parts A and B are found to be consistent to the relative locations of the original authentication regions, the firearm may be authenticated. Specifications of this type may be stored with or as part of a digital fingerprint of an object.

Once a digital fingerprint of an object is acquired, a characterization of the object and corresponding fingerprint may be recorded in a database. For example, in some embodiments, a fingerprint may comprise one or more feature vectors. In some applications, the database may be secure. In some embodiments, a unique identifier or ID may be assigned to an object, for example in cases where an ID may be a convenient index in an application. However, an ID is not required since a digital fingerprint itself may serve as a key for searching a database. In other words, by identifying an object by the unique features and characteristics of the object itself, arbitrary identifiers, labels, tags, etc. are rendered unnecessary.

FIG. 1A is a simplified flow diagram illustrating a method 100 for creating and registering a digital fingerprint of an object in a database. The process, in one embodiment, includes acquiring a digital image data of the object, at block 102, as described above. A variety of scanning technologies and devices may be used as previously noted. Next, features are extracted, at block 104, from the digital image data. As above, specific features or regions of interest (authentication regions) may be selected in anticipation of subsequent identification or authentication attempts of an object. The extracted features are analyzed and feature vectors are extracted to form a digital fingerprint, indicated at block 106. The digital fingerprint may be stored in a database record at block 108. Other forms of searchable digital data storage should be deemed equivalents. Further, at block 110, initialization data may be added to the database record or associated with it in a related table. This data may be associated with the physical object that was scanned. This data may be, for example, a description, manufacturer, model number, serial number, contents, or any other data deemed appropriate or useful for the object or a class of objects.

Figure 1B:
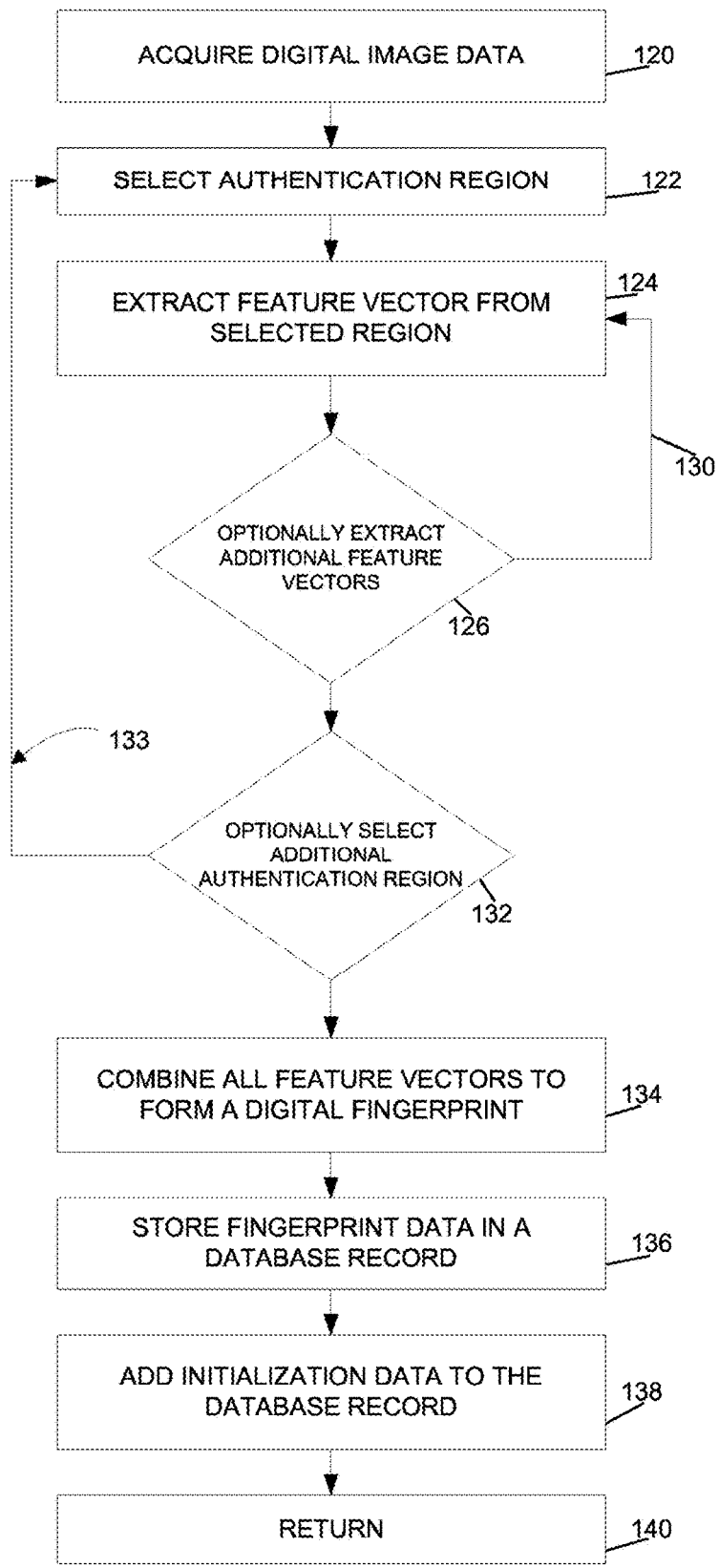
FIG. 1B illustrates an example of an alternative process for feature extraction.

FIG. 1B illustrates an example of a process that includes more robust feature extraction. In one embodiment, the process similarly begins with acquiring digital image data, at block 120. At least one authentication region is selected, at block 122. This may be done by analysis of the image data, analysis of related image data, by reference to a predetermined template that defines at least one authentication region, or other means. The next block 124 calls for extracting a feature vector from a selected authentication region. A feature vector may be used to represent features of a region in a more compact form. In some examples, a feature vector may comprise an array of color or gray scale numeric values corresponding to areas within the selected authentication region. The values may each comprise a sum, average, maximum, or other function of the individual values of a corresponding group of pixels forming a sub-part of the region. In some embodiments, a feature vector may identify a location and shape of a distinctive aspect within a selected region. In decision 126, there may be additional feature vectors to be extracted from the same image data. In that case, the flow returns, path 130, to repeat the feature extraction block 124. The loop comprising block 124, path 130, and decision 126 may repeat until all desired feature vectors are collected. Optionally, there may be another authentication region to process in the same image data, see decision 132. In that case, path 133 is traversed back to block 122 for further feature extraction with respect to one or more additional authentication region. Then some, or all, of the extracted feature vectors may be combined to form a digital fingerprint, block 134, which is then stored in a database record, block 136, along with related data, block 138, as mentioned above. The process returns or concludes at block 140.

A database of digital fingerprints may form the basis of a system to identify or track an object in a supply chain, distribution network, sales channel, or any other series of locations, ownerships, or possessions. An identification system based on digital fingerprinting has unique advantages and capabilities that are not available with identification systems based on currently available methods.

Current identifiers such as holograms, bar codes, and serial numbers may all be duplicated (or otherwise counterfeited) with varying degrees of effort. Because such identifiers are vulnerable to diversion and counterfeiting, a counterfeit object with a duplicated identifier—and counterfeit objects with otherwise counterfeited identifiers—may enter a supply chain or distribution network. The counterfeit identifiers may subsequently be registered in a conventional identification or track-and-trace system. All current identification systems rely on determining whether the identifier (label, hologram, RFID tag) is legitimate, not whether the object itself is legitimate.

Due to this weakness, identification and tracking systems based on conventional approaches like bar codes or serial numbers cannot prevent counterfeit objects from entering a supply chain or prevent the resulting corruption of the system database. A counterfeit object may be mistakenly identified as genuine, and generate a false audit trail as it is identified through the supply chain. Two or more objects with the same ID (one genuine, one or more counterfeit) may exist at the same time without detection. Without physically examining the objects it may be impossible to tell which object is genuine and, depending on the quality and origin of the counterfeits, even physical examination of an object may be insufficient to determine its authenticity.

Once a counterfeit object has been detected in a conventional system, false audit trails must be removed from the system database to restore integrity. This may be difficult depending on the structure of the database and the complexity of the identification data. In some cases, the objects may not have any further contact with a system (for instance if they are purchased by a consumer), and the record will never be identified as false, leaving the database permanently corrupted.

In some embodiments of the present disclosure, an object may be scanned and identified at initial manufacture. Alternatively, an object may be scanned and identified at any subsequent time or location for entry into a database. Preferably, the scanning and identification is carried out when an object is either in the possession of its manufacturer or has been transferred by secure means to the point of scanning so that its legitimacy at the point of identification may be adequately established. However, this is not necessary and the adequate legitimacy of an object may be established through various other means both prior to or following induction.

Figure 2:
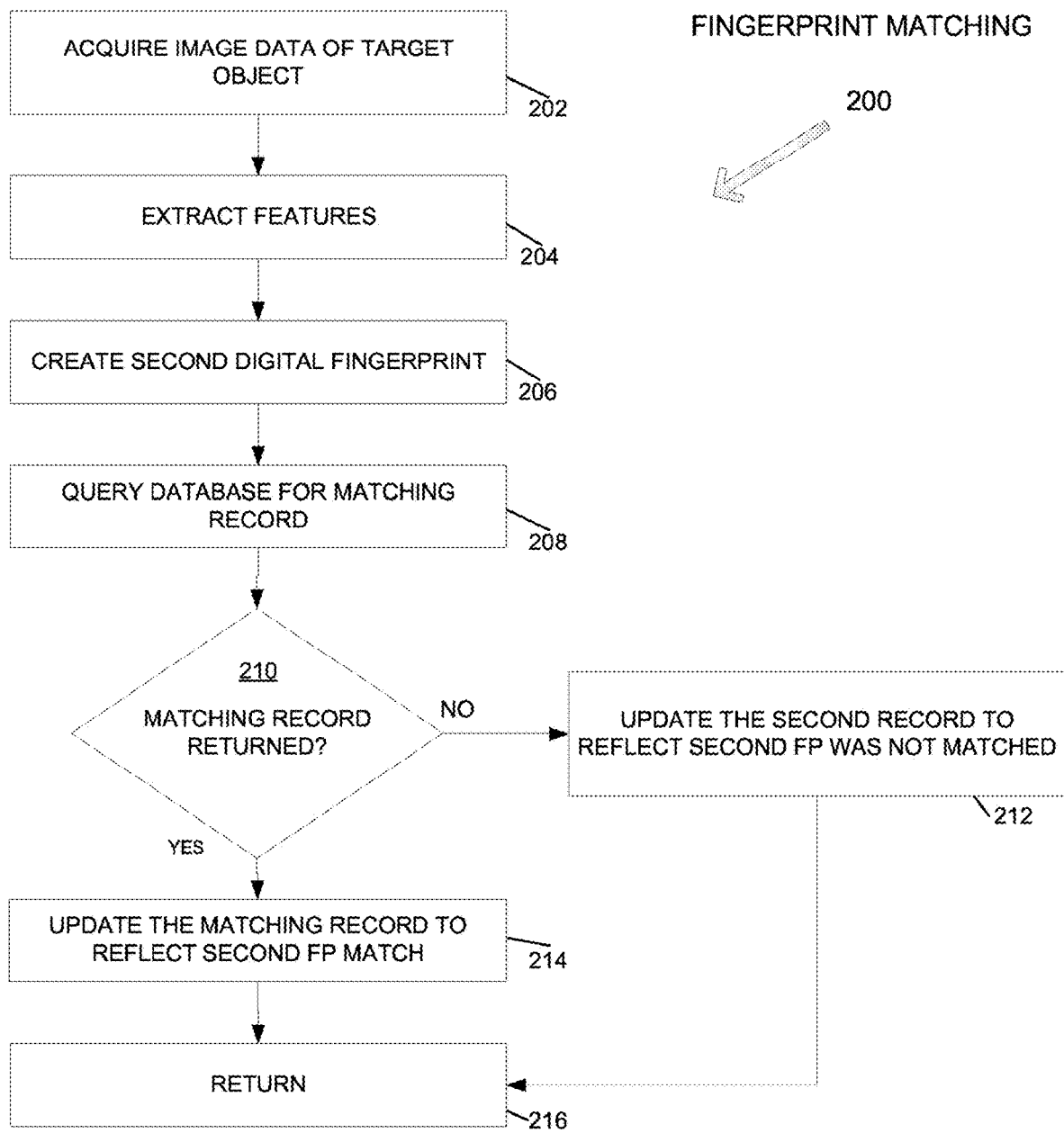
FIG. 2 is a simplified flow diagram illustrating a method for matching a digital fingerprint of a target object to a database of existing digital fingerprints.

In an embodiment, the system subsequently identifies the scanned and identified object every time the object is scanned again, typically at discrete steps in manufacturing, distribution, and sale, and as part of a data collaboration scheme. FIG. 2 is a simplified flow diagram illustrating a method 200 for matching a digital fingerprint of a target object to a database of existing digital fingerprints. Block 202 shows acquisition of the image data of a "target object" i.e., the object sought to be identified or authenticated by returning a match in the database. Features are extracted the target object image data at block 204, as discussed above. A new (second) digital fingerprint record is created based on the extracted features at block 206. The next step is querying the database, block 208, for a record that matches the second digital fingerprint record. "Matching" in this context may reflect a threshold confidence level rather than a binary decision. The requisite confidence level may vary depending on the specific application. The confidence level required may be varied dynamically responsive to the data and experience with a given system. If no "matching" record is returned, decision 210, the second digital fingerprint record (the digital fingerprint ("FP") of the target object), block 212, is updated to reflect that no match was returned. If a match is returned, the matching record is updated to reflect the match at block 214, for example, it may be linked to the second record. The results may be returned to the user at block 216.

Figure 3:
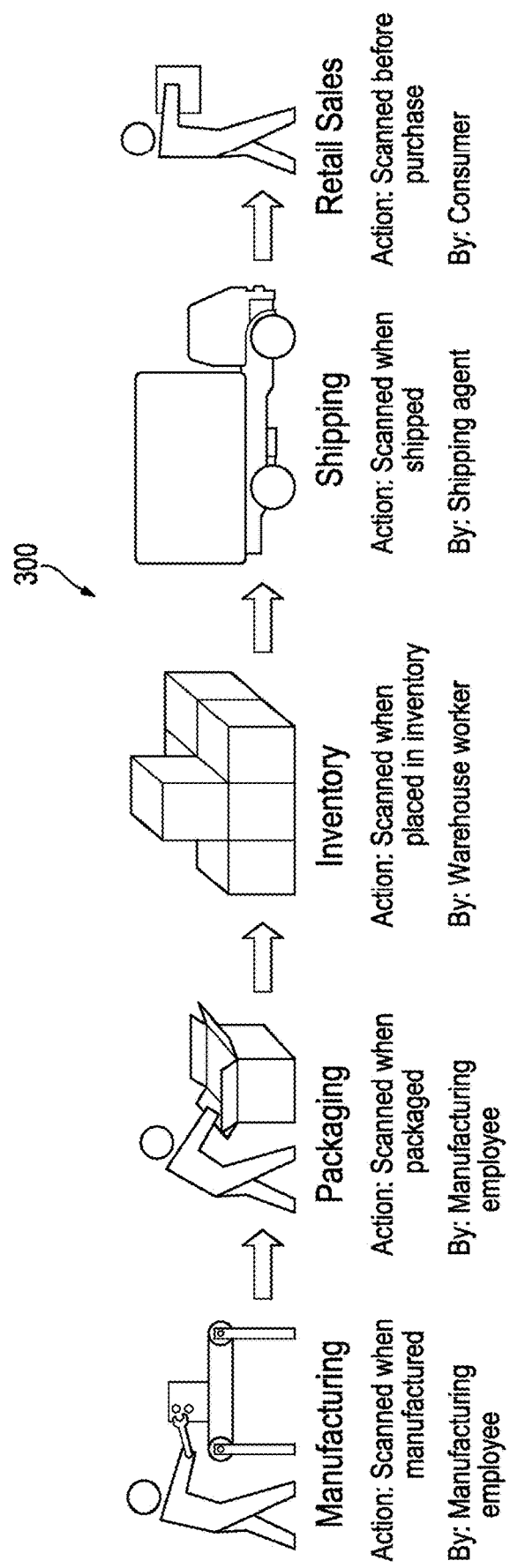
FIG. 3 is a simplified conceptual diagram showing a method for scanning of an object at various times and places along a manufacture and distribution chain.

Examples of scanning locations might include scanning at the point of manufacture, when packaged, when placed in inventory, when shipped, and at a retail point of sale (e.g. upon arrival and again when sold), as illustrated in the tracking process 300 of FIG. 3. Scans may take place as a part of a data collaboration scheme. Each scan may be used to update a remote database.

As previously described, a "scan" may refer to an image (or to digital data that defines an image) captured by a broad range of capturing devices. In an embodiment, a scan of an object may capture both features of the object and features of an identifier that has been attached to the object. Feature vectors extracted from authentication regions located on an attached identifier are based on the substances of which the identifier is physically comprised rather than the information (typically alphanumeric) that is intended to be communicated by the identifier. For instance, in the case of a wine bottle, features may be captured from the bottle and from a label affixed to the bottle. If the label includes a standard UPC bar code, the paper of the label and the ink pattern of the bar code may be used to extract a feature vector without reading the alphanumeric information reflected by the bar code. An identifier, such as a UPC bar code print consisting of lines and numbers, has no greater significance in the creation and use of a feature vector than a set of randomly printed lines and numbers.

Figure 4:
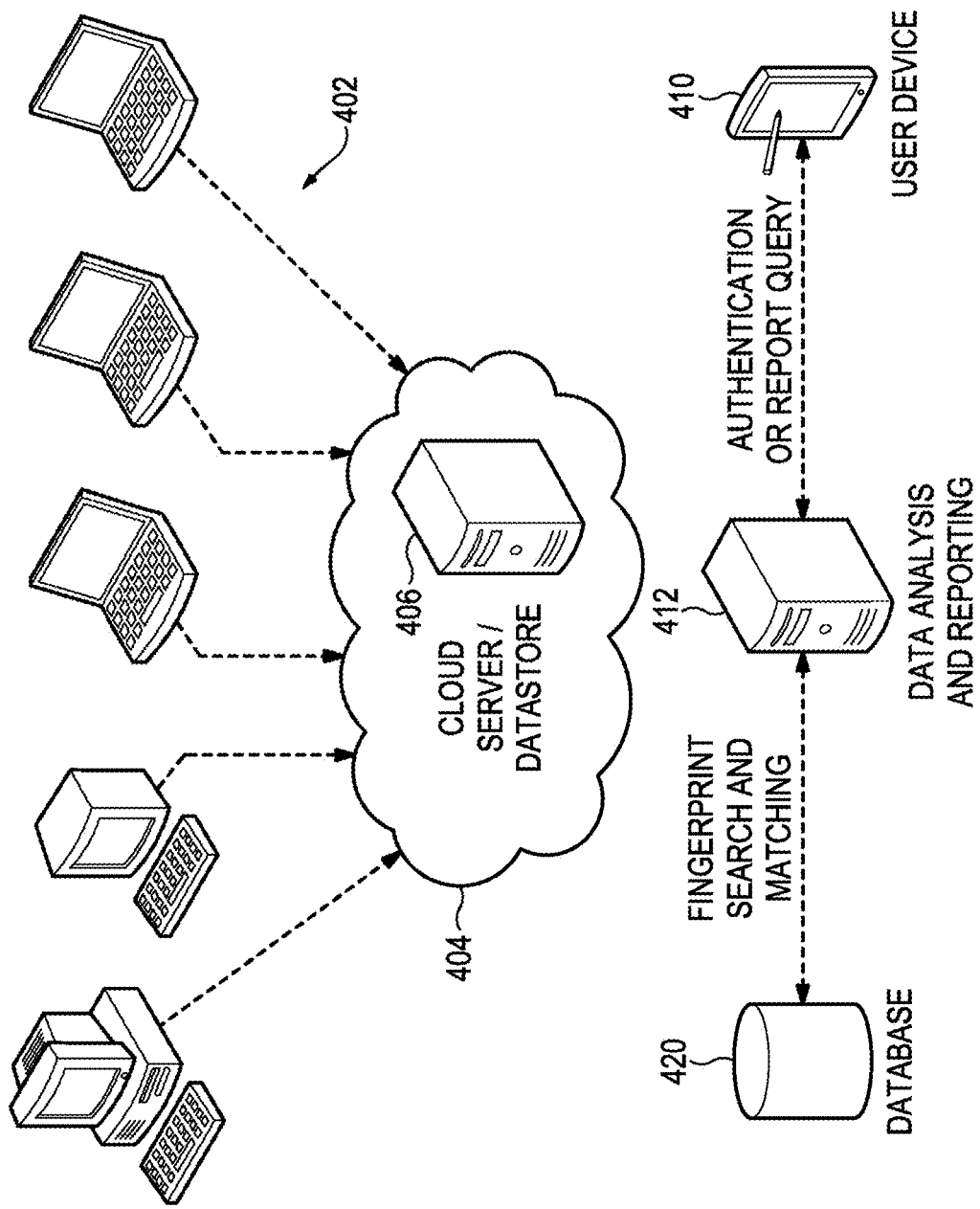
FIG. 4 is a simplified conceptual diagram illustrating an example of the use of a mobile device application to query authentication information related to an object.

FIG. 4 is a simplified conceptual diagram illustrating an example of the use of a mobile device application to query authentication information related to an object. Here, various computing devices or terminals 402 may have access over a network, for example, the internet 404, to cloud computing facilities or services such as a cloud server or other datastore 406. For example, devices 402 may be located at various points along a distribution chain as illustrated in FIG. 3, each location scanning an object and updating a cloud server or other datastore 406.

A server 412 may be provisioned to provide identification and/or tracking data analysis and reporting. The server 412 has access to a database 420 which may be used to store digital fingerprints and related data. The server can query or search the database 420 for digital fingerprint search and matching. The database 420 is preferably coupled to the cloud server 406 in some embodiments. A mobile user device 410 such as a smartphone, tablet, laptop computer, or dedicated device may be configured for communications with the server 412 to request and receive a reply or authentication report for an object of interest. This architecture is simplified, and in any event, is merely illustrative and not intended to be limiting.

In some embodiments, sensors may be attached to the object, and sensor data can flow back to the database in either a continuous fashion (near real time), or in discrete data transfer events. For example, data transfer may occur when an authentication event occurs. For instance, if there is a GPS chip attached to the object, data flow can start when the object is first registered in the system, and continue to flow as the object changes location. Continuous or intermittent data updates may also be buffered in local memory in a sensor attached to an object, and then downloaded the next time the object is scanned and authenticated. This example provides an itinerary record of where the object has traveled.

As an example of the potential uses of sensor data, many products like food and beverages can degrade with exposure to certain environmental factors during storage and shipment. Examples of sensor data could include temperature, humidity, light exposure, altitude, oxygen level, or other factors, as well as location such as GPS data.

Figure 5:
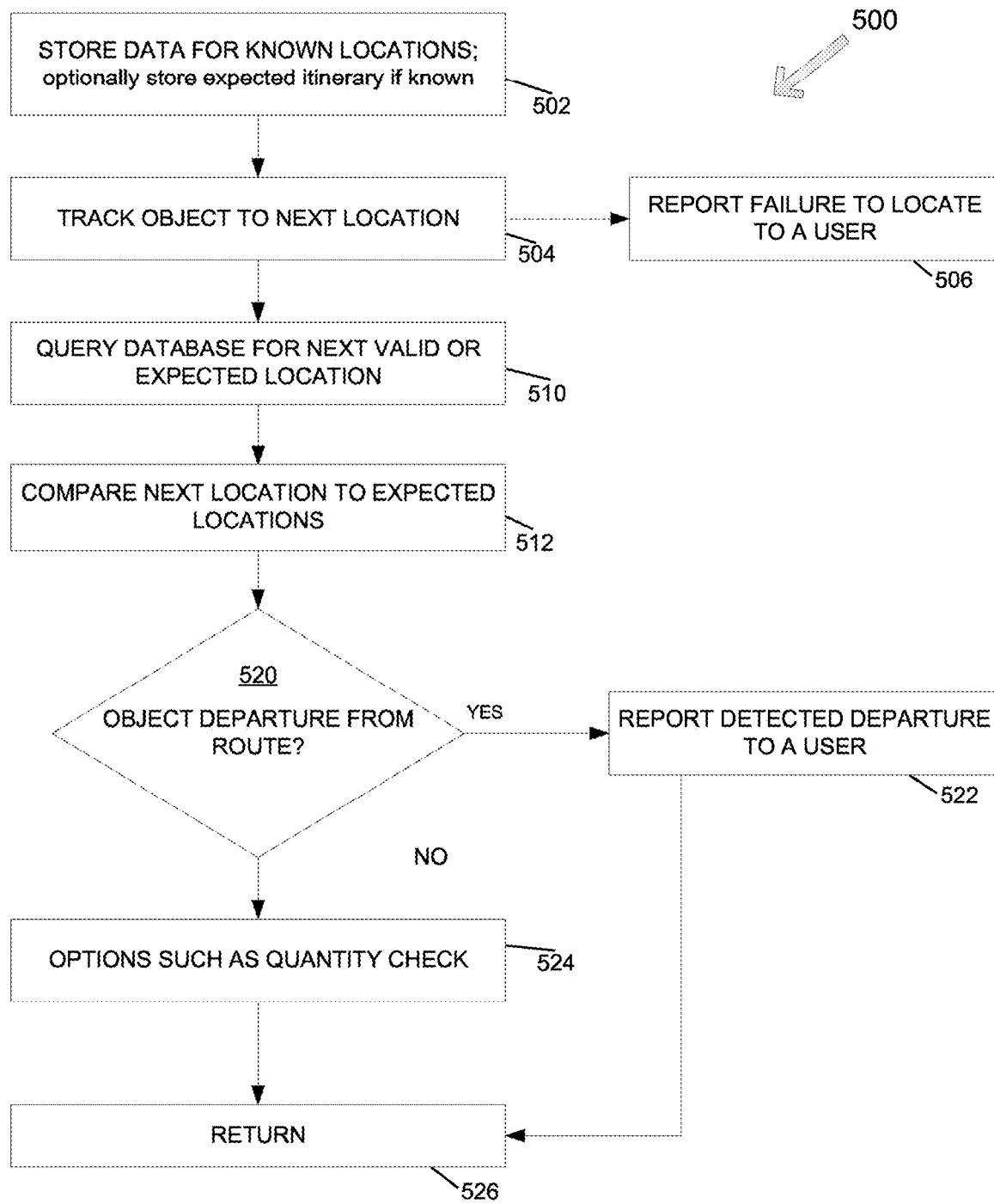
FIG. 5 is a simplified flow diagram illustrating a method for tracking an object to verify its provenance.

FIG. 5 is a simplified flow diagram illustrating one embodiment of a process 500 for identifying an object to verify its provenance. Here, an expected itinerary of an object (a series of locations) may be stored in a datastore if known, block 502. The methods and systems described above may be used to track the object to the next location, block 504. If the object does not arrive as expected (where and when expected according to the itinerary), the failure may be reported to a user, block 506. In an embodiment, an object that arrives later than expected may be subjected to closer matching scrutiny to ensure its identity.

The next step, block 510, is to query the database for the next valid or expected location. A unique itinerary may not be known, but a set of valid or expected locations may be known. The next actual location of the object (as determined by imaging and matching digital fingerprints) may be compared to the expected location(s) returned by the database, block 512. If that comparison indicates a departure from the expected or authorized route, decision 520, the result may be reported to a user, block 522. (A report that the object is on track may be reported as well.) Other options may be implemented such as a quantity check, block 524. The process returns or terminates at block 526.

Most existing identification systems are designed only to be accessed by manufacturers or their authorized distributors, and some require specialized scanners or equipment. However, consumers also have a vested interest in determining whether the objects they are buying are authentic. Other parties may also have an interest in determining the authenticity of an object, for example in response to offered or future incentives for object data collection. In some embodiments, the present system is designed to enable anyone along the supply, distribution, or sales chain, from manufacturer to the retail consumer or other members of the public, to access the system and determine whether the object is authentic. A specialized scanner is not required in all cases. For example, in one embodiment a mobile phone application designed for public use can be employed to scan an object, query the database, and determine if the object is authentic.

Finally, data collected by a digital fingerprinting system offers a variety of useful information to stakeholders along the supply, distribution, and sales chain. Reports can be generated on individual objects, or on sets of objects. These reports can include, but are not limited to, the locations of objects over time, audit trails, points of entry of counterfeit goods, and exposure to environmental variables over the course of an object's lifetime.

Tags and Bar Codes

In some instances, an identifier such as a tag or a label may be considered a useful addition to an object, mainly for two reasons. The first main reason is that a human may need to reference it for information. For example, a tag or a label may inform a store clerk as to the particular style and size of a piece of clothing by a particular manufacturer, or it may tell a postal carrier the address to which a mail piece should be delivered. The second main reason has to do with the employment of machine-readable tags, for example when an Intelligent Mail Barcode on a mail piece (unreadable by humans) is used to route the mail piece by machine. The entire class of existing machine-readable tags can be replaced by the methods of the present disclosure. In some instances, tags or labels may still be needed for human information but they are unnecessary for the purpose of authentication or any machine-readability functions.

Because digital fingerprinting exploits natural features and often involves scanning an object under variable conditions, it is highly unlikely that two different scans will produce the exact same fingerprint. As a result, an ability to look up objects in the database when there is a near-miss is included. In one example, two feature vectors [0, 1, 5, 5, 6, 8] and [0, 1, 6, 5, 6, 8] are not identical but, given a certain difference metric, they may be close enough to say with a level of certainty that they are from a certain object that has been scanned before. This is particularly true if, otherwise, the nearest feature vector of a different object is, for example, [5, 2, 5, 8, 6, 4]. For example, a distance between vectors of n-dimensions may be calculated and used as one metric of similarity or "closeness of match" between two or more vectors. The distance to the next nearest candidate may also be considered.

Global Versus Regional Feature Matching

In some embodiments, where we have an original document or other object fingerprinted, the digital fingerprinting techniques allow region-by-region matching, making apparent which (if any) regions have changed from the original. Thus, for example, a good overall match on a passport may be achieved but if none of the matches happen in the photograph it becomes apparent that the photograph has likely been changed. Further, if some individual or group, say a known terrorist group, has a certain pattern or regularity to altering passports—such as to change the photo, the date of birth, and one digit of the passport number—then this ability to find altered regions may also provide the ability to discern a pattern of changes that may be used to identify a "signature" modus operandi of a particular counterfeiter. Thus, aspects of digital fingerprinting may be applied not only to detect a forged or altered object, but may also be used to identify a counterfeiter or otherwise discover the source of an altered object.

Authenticated Production

This disclosure teaches an integrated, secure process that combines production or other creation of physical objects with secure induction of digital information, including a digital fingerprint of that object, into an authentication system for later use. That later use may include identification, authentication, tracking, or other purposes. The digital fingerprint may be associated with other data such as a serial number, manual, photograph, tracking and manufacturer information, or other information. The digital fingerprint and associated information may be stored in a secure database for later use.

The exact method of creating such a digital fingerprint is not important, in some embodiments. There are many satisfactory ways to extract a digital fingerprint of an object known in the literature, including SIFT, SURF, and others.

The secure induction process taught here does not depend on any particular database system, provided the database is so constructed that no one, including the creator of the object, can inappropriately enter authentication data into the system. For example, no one can take an object he did not create and induct it as though he did. Nor can anyone enter a non-existent object into the authentication process. Nor can anyone produce an object with the system that is not inducted (this last is to avoid "midnight runs" of counterfeit objects on a real assembly line).

Because the creation of the object and the induction of the digital fingerprint are part of a single process, and because the digital fingerprint does not rely on tags, labels, barcodes or other artificial identifiers of an object, the process taught here is better proofed against counterfeiting than existing manufacturing processes.

Manufacturing is becoming increasingly decentralized. The advent of 3-D printing and other rapid prototyping or small-lot production systems, and the ease with which the digital files behind many such systems can be copied, mandate an authentication process that at the same time ensures that the local manufacturer cannot corrupt the process (for example by issuing false certificates of authenticity) While securely tying the object to authenticating information generated when the provenance of the object is known.

If a manufacturer controls the production, induction, and ultimate authentication of the object, tying the creation and digital fingerprinting processes together in a way safe from, say, the manufacturer's own fraud, may not be critical. When, however, parts are contracted out, and particularly when they can be made on relatively inexpensive equipment from digital files (such as on a 3-D printer), it becomes important to establish that the digital fingerprints to be used in authentication are captured as part of the manufacturing process and that an independent record linking the creation of the object with its authentication information be created in a way not corruptible by, say, counterfeiters. That secure integrated process is what this disclosure teaches.

Some embodiments include a single secure process for the automatic creation and induction (for later authentication) of a digital fingerprint of an object. In one embodiment, an object is created on a 3-D printer. The printer creates the object in accordance with its instructions and, while doing so, extracts one or more digital fingerprints of the object, where those digital fingerprints take advantage of the natural randomness of the printing process (e.g. "random" surface features) but may also reference other, deliberate features (e.g., artificial identifiers such as microscopic etchings). The digital fingerprints may be tied to other digital information about the object and the creation process. The digital fingerprints and associated data are stored securely in a database for later use for authentication. The overall system is secure from inappropriate tampering by the producer or anyone else, perhaps by encrypting the database to secure it from tampering during the manufacturing process or at a later time.

Among the objects associated with a digital fingerprint of a newly-manufactured object may be a template (for how the just-created components will later be assembled), a time and date stamp for the creation, a production device identifying number, product warnings, intended product recipients, sensor data related to, say, a controlled manufacturing environment, as well as user-supplied information such as product manuals and certificates of creation, provenance, or authenticity. The manufacturing process may automatically create a secure data record for later retrieval as part of object authentication. The ultimate use of the data associated with the object at its point of creation is not relevant.

In another embodiment, an artist may create a work of art such as an etching, digitally fingerprint the artwork, associate the digital fingerprint with an authentication certificate or other information associated with the work, and insert the resulting data in a secure database for later authentication by, say, a purchaser.

In another embodiment, all components that constitute an object may be inducted during their individual production processes. That induction may include a list or partial list of all of the final product's inducted components and their intended relationships in the final product. For example, while a computer is assembled on an assembly line, each circuit board, drive, and chip is inducted prior to final assembly. An actor or stakeholder may later to authenticate all critical components of an object as well as the object itself to verify an object's authenticity. Some embodiments thus provide a much higher level of authenticity assurance, than information acquired from authenticating the outside of the completed object. This approach insures against a wide array of scenarios including sabotage, the swapping of legitimate components for illegitimate, and other fraudulent activities.

In a further embodiment, this method may be used in fraud prevention where goods are returned to original supplier or point of sale. A person seeking to commit fraud may intentionally replace the original with non-standard components. Under the teachings of this disclosure, if, at the point of manufacture or assembly sanctioned or branded components of an object are themselves inducted and associated with the final object, the object itself cannot be authenticated unless its associated components are as well.

Figure 7:
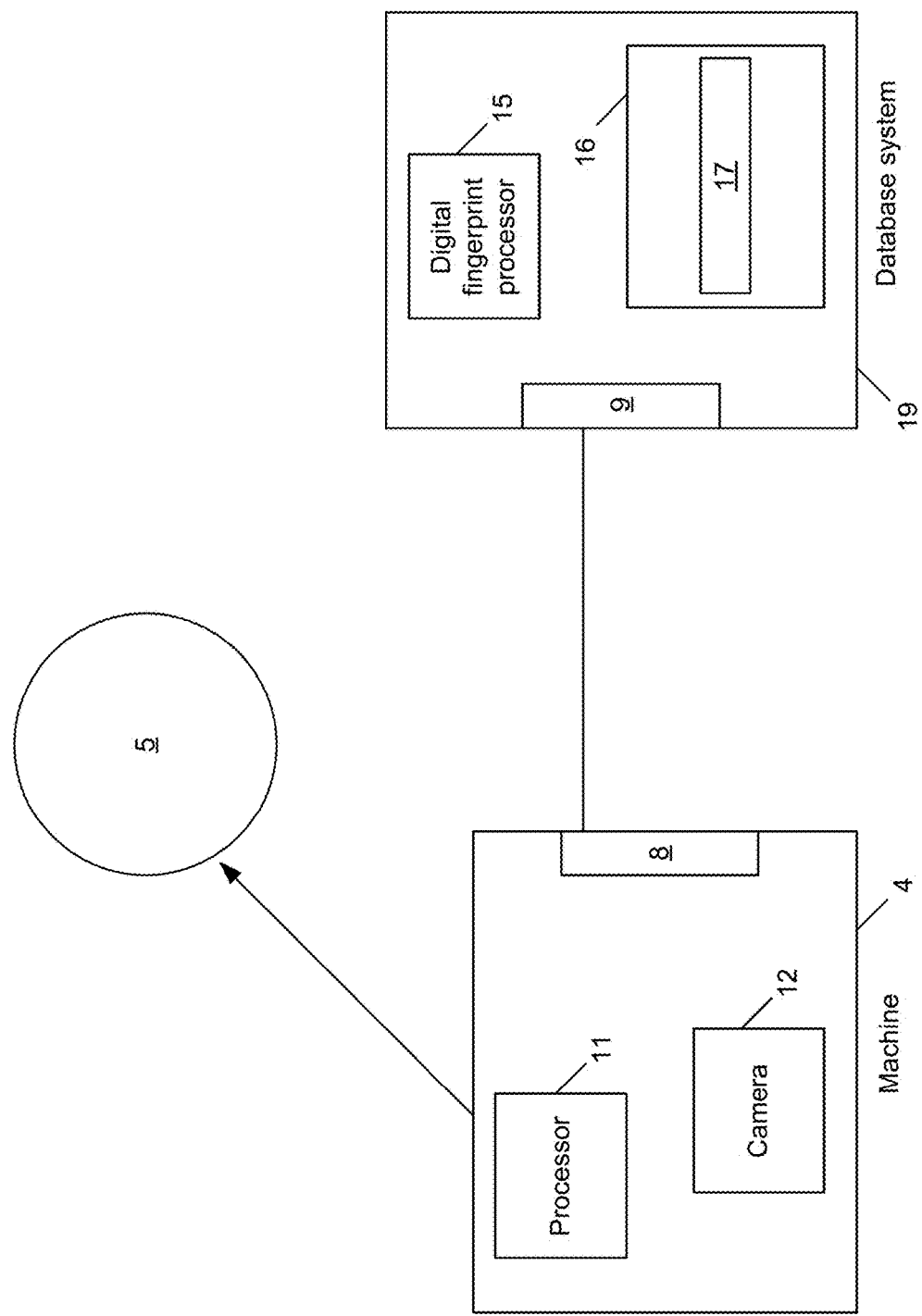
FIG. 7 is a simplified block diagram of aspects of an example system for implementing some embodiments of authenticated production using a machine to produce manufacture physical products or manufactures.

FIG. 7 is a simplified block diagram of aspects of an example system 700 for implementing some embodiments of authenticated production using a machine 4 to produce manufacture physical products or manufactures. The system 700 includes a database system 19, which may include an interface 9 (e.g., a network interface), a storage (not shown) to store a data structure 16 (e.g., as a table or other object), and a digital fingerprint processor 15 to control the database system 19. The digital fingerprint processor 15 may be configured to perform any of the processes described with reference to FIGS. 1-6 or any other process described herein.

The machine 4 to produce manufacture physical products or manufactures may be any machine such as one to utilize raw materials to produce physical objects (such as a 3D printer to layer a material to form a physical object, a printer to deposit ink on paper to form a document, or the like, or combinations thereof), or one to utilize assemble/arrange/connection/etc. one or more components to form a system (e.g., to arrange gears to form a gear train). The machine 4 may include a processor 11 and an interface 8 (e.g., a network interface) to communicate with the database system 19 before, during, and/or after production or manufacture for authenticated production.

The digital fingerprint processor 15 may be configured to identify an activation of the machine 4 to attempt to produce or manufacture at least one of the physical products or physical manufactures. In some examples, the digital fingerprint processor 15 may be in communication with a processor 11 installed in the machine. For instance, the digital fingerprint processor 15 may detect the activation of the machine by receiving a signal generated by the processor 11 and transmitted over the network to indicate the activation.

The digital fingerprint processor 15 may be configured to acquire digital image data of a portion of a physical object, which may be inside/on/etc. the machine 4. In some examples, the digital fingerprint processor 15 and/or the processor 11 may control a camera 12 that is integrated in the machine 12 or non-integrated (e.g., a separable component, perhaps a mobile device, mounted on the machine or otherwise positioned proximate to the machine).

The portion of the physical product may be a completed surface. For instance, if the machine 4 is a 3D printer, the camera 12 may capture an image of a completed surface (the 3D print job need not be complete at a time the image is captured so long as the imaged surface is complete). For example, the imaged surface may be edges of completed layers where additional layers are still to be deposited on top of the completed layers. In some examples such as some 3D printing examples, the image may be a surface that is to be an external surface of the completed 3D print job; however, in other examples the image may be of any surface that is to be accessible on completion of the manufacture or production (for instance an image of a surface of a gear on the interior of a watch).

The digital fingerprint processor 15 may be configured to analyze the digital image data to form a digital fingerprint of the physical object. The digital fingerprint may be responsive to structure of the physical object. The digital fingerprint processor 15 may store the digital fingerprint in a database record 17 of the data structure 16, which may be to induct at least one of the physical product or physical manufacture 5 produced by the machine 4.

It should be appreciated that in some examples, the imaging may be, for instance, during or after production of the physical product or physical manufacture 5. In one example, the imaging may be prior to completion of the production of the physical product or manufacture 5 produced by the machine 4 (the image may be of a completed surface and/or a component to be used to complete production of the physical manufacture, e.g., a gear in the case of producing gear trains or even an unmarked portion of a piece of paper showing a structure of paper fibers in the case of producing documents). In some examples, the digital image data may be acquired responsive to completion of one or more operations associated with the activation by the machine 4. For instance, the machine 4 may be turned on, initialized, loaded, finish some or all phases of fabrication, or the like, or combinations thereof, and the digital image data may be acquired responsive to the completion of one or more of these operations. In some examples, the digital image data may be acquired responsive to a three-dimension object being fabricated, e.g., partially fabricated (the digital image data may be of a completed portion of the three-dimension object, say a bottom portion of a sidewall of an uncompleted the three-dimension object where additional layers are yet to be added to the top). For instance, the digital image data may be of a "clean" piece of paper to be used for an initialized print job, or a portion of the piece of paper that has been printed (e.g., marked paper). The digital image may be acquired of a gear responsive to an assembly of a gear train, or the gear being loaded into the machine (e.g., yet-to-be-assembled into the gear train say positioned on a feeder such as a conveyor to be used to assemble the gear train).

In examples in which the imaging is prior to completion of the production, the digital fingerprint processor 15 may perform a validation check prior to completion of the production. Based on a result of the validation process, the digital fingerprint processor 15 may control the machine 4 to prevent the production from completing in the case of unauthorized production (e.g., to abort the job). For instance, the digital fingerprint processor 15 may signal the processor 11 or signal a power supply (not shown) to hinder or stop an attempt for a "midnight run". In some examples, it may be possible for the processor 11 to perform a validation check responsive to an attempt to activation the machine. For instance, if the processor 11 is unable to communicate with the digital fingerprint processor 15 responsive to a user control to operate the machine 4, the process 11 may reject a command to operate the machine 4 and/or put the machine 4 into a low power state (in which say the processor 11 may operate but one or more other components of the machine may not receive operating power).

Figure 8:
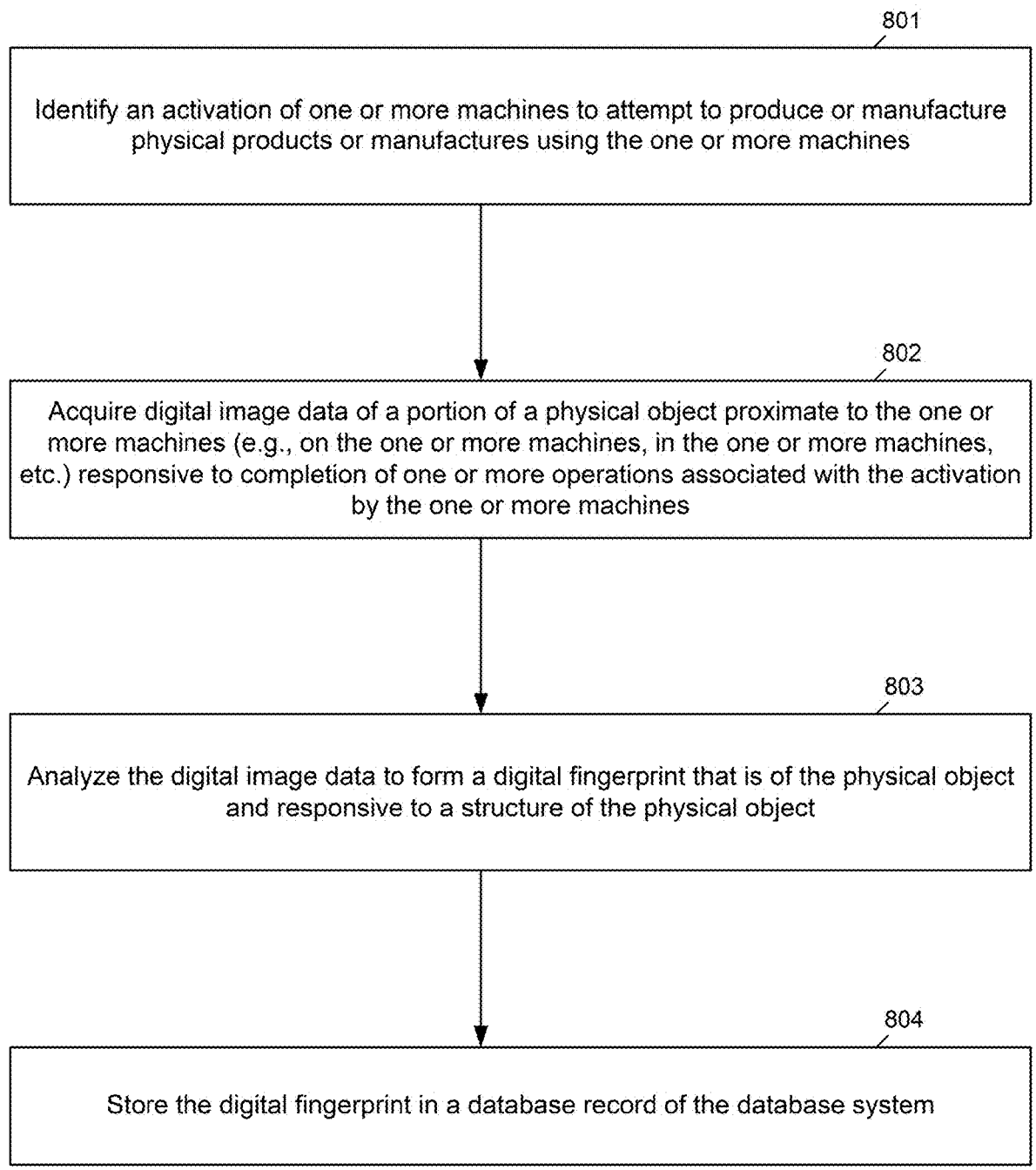
FIG. 8 is a simplified flow diagram of an example of a process for authenticated production, in some embodiments.

FIG. 8 is a simplified flow diagram of an example of a process 800 for authenticated production, in some embodiments. In block 801, a processor of an authentication system (e.g., a digital fingerprint processor in communication with one or more remote points of manufacture, such as digital fingerprint processor 15 of FIG. 7) may identify an activation of one or more machines to attempt to produce or manufacture physical products or manufactures using the one or more machines.

In block 802, the processor may acquire digital image data of a portion of a physical object proximate to the one or more machines (e.g., on the one or more machines, in the one or machines, or the like, or combinations thereof) responsive to completion of one or more operations associated with the activation by the one or more machines. In block 803, the processor may analyze the digital image data to form a digital fingerprint that is of the physical object and responsive to a structure of the physical object. In block 804, the processor may store the digital fingerprint in a database record of the database system.

It should be appreciated that some or all of process 800 may be performed for each physical object to be manufactured by the one or more machines (e.g., each gear produced by gear-producing machine), in some embodiments. Also, if the physical object is part of an assembly such as a geartrain, some or all of process 800 may be repeated for each component (e.g., each gear), and some or all of process 800 may be repeated for the assembly. In such a case, each digital fingerprint may be stored in its own record, which may be linked together.

Some systems or processes of authenticated production may include authorization check(s) combined with induction for authentication (authorization features may be used to prevent midnight runs in the first place); however, this is not required. Even if a midnight run is performed without creating records, such product may not may not be inducted into the authentication system and may not be authenticatable due to the lack of induction. Such non-authenticatable product may be detected at points of authentication in other parts of a supply chain.

Figure 9:
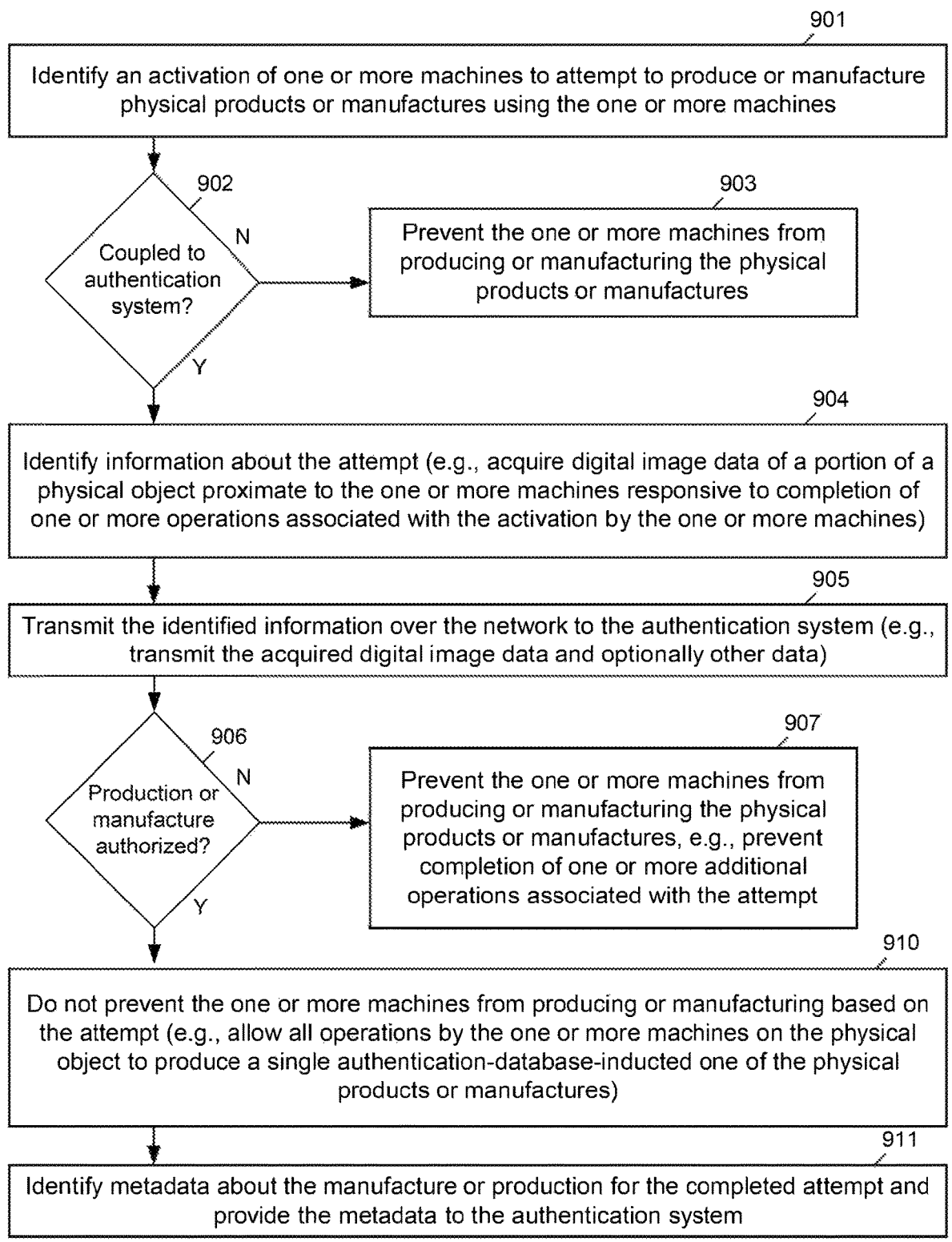
FIG. 9 is a simplified flow diagram of an example of a process for authenticated production, in some embodiments.

FIG. 9 is a simplified flow diagram of an example of a process 900 for authenticated production, in some embodiments.

In block 901, a processor of an authentication system (e.g., a processor to control operation of one or more machines, such as processor 11 of FIG. 7) may identify an activation of the one or more machines to attempt to produce or manufacture physical products or manufactures using the one or more machines.

In diamond 902, the processor may identify whether it is coupled to an authentication system, e.g., whether it can communicate with a digital fingerprint processor). If the processor is not coupled to the authentication system, the processor may prevent the one or more machines from producing or manufacturing the physical products or manufactures in block 903.

In block 904, the processor may identify information about the attempt (e.g., acquire digital image data of a portion of a physical object proximate to the one or more machines in responsive to completion of one or more operations associated with the activation by the one or more machines). In some examples, the one or more machines may include a component to limit and/or detect physical access to the physical object once loaded into the one or more machines as part of an initialization.

In block 905, the processor may transmit the identified information over the network to the authentication system (e.g., transmit the acquired digital image data and optionally other data, such as login credentials of an operator, time of day, intrusion information, or the like, or combinations thereof). In block 906, the processor may identify whether production or manufacture is authorized, e.g., may check whether a signal such as an authorization signal is received. In block 907, the processor may prevent the one or more machines from producing or manufacturing the physical products or manufactures, e.g., prevent completion of one or more additional operations associated with the attempt.

In block 910, if authorized, the processor may not prevent the one or more machines from producing or manufacturing based on the attempt (e.g., allow all operations by the one or more machines on the physical object to produce a single authentication-database-inducted one of the physical products or manufactures). In block 911, the processor may identify metadata about the manufacture or production for the completed attempt (such as time of completion), and may provide the metadata to the authentication system, which may add the metadata to the record.

Figure 10:
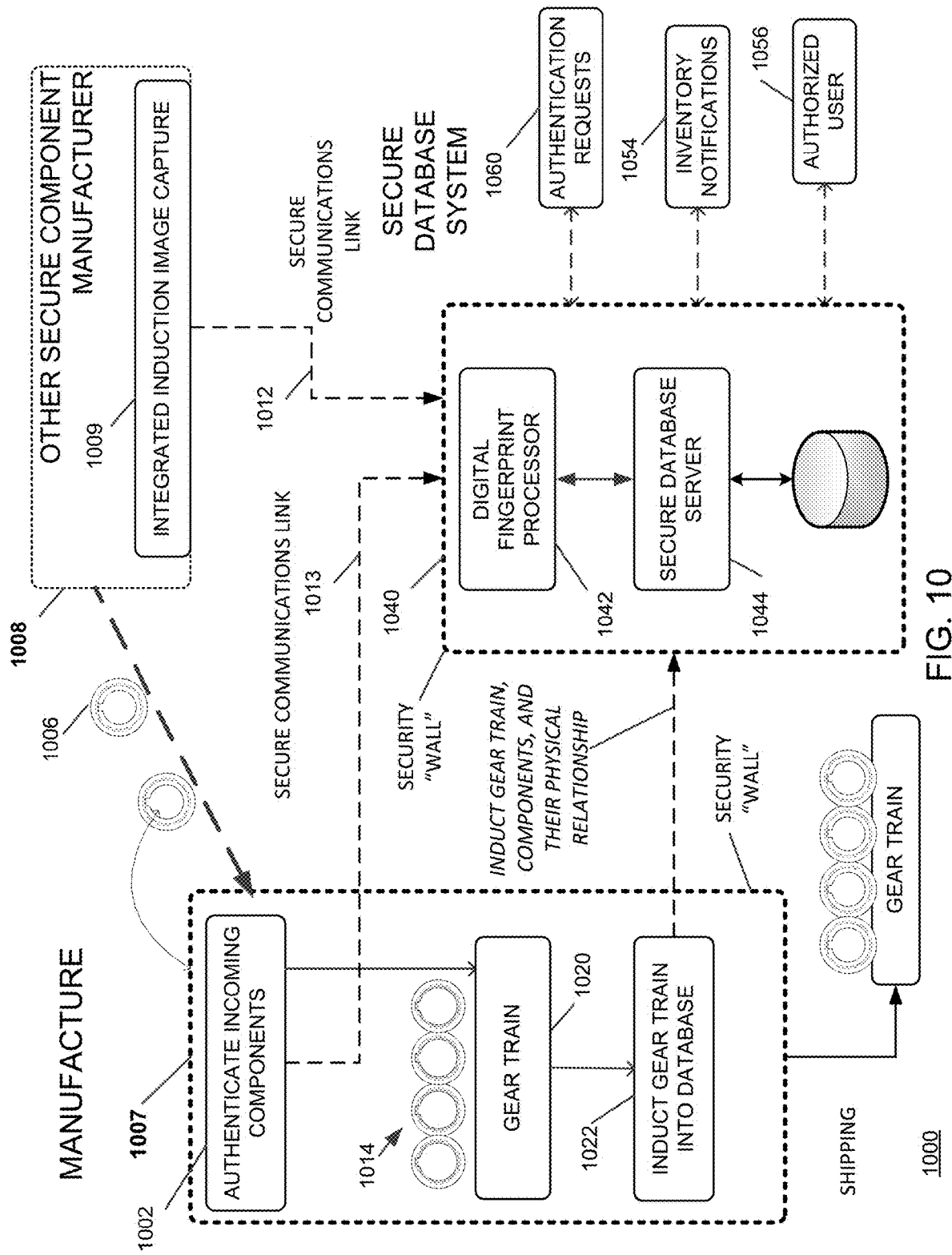
FIG. 10 is a simplified block diagram of aspects of another example system for implementing some embodiments of authenticated production using a machine to produce manufacture physical products or manufactures from inducted components.

FIG. 10 is a simplified block diagram of aspects of another example system 1000 for implementing some embodiments of authenticated production using a machine to produce manufacture physical products or manufactures from inducted components.

In the illustrated example, a manufacturer may use authenticated production to manufacture a gear train 1020. In one example, the manufacturer may authenticate 1002 a physical object entering a physical space controlled by the manufacturer, e.g., the security "wall" 1007. This may be one of the authentication requests 1060. For instance, the manufacturer may receive a physical object, may communicate with digital fingerprint processor 1042 of a database system over a secure communications link 1013, e.g., may provide an image of the physical object to the digital fingerprint processor 1042. The digital fingerprint processor 1042 may perform any authenticated process described herein based on the image to match the image to a record existing in the secure database server 1044, and may provide a result responsive to a match.

The result may verify that the physical object is the gear 1006. In some examples, the gear 1006 may originate from a secure component manufacturer having its own security "wall" 1008. The secure component manufacturer may have produced the inducted component 1006 using authenticated production including sending and/or receiving information over secure communications link 1012 and integrated induction image capture 1009. For example, the secure component manufacturer may have performed any of the processes described with respect to FIGS. 7-9 in association with the gear production, and may provide the gear 1006 following authenticated production.

Referring again to the gear train manufacturer, the manufacturer may, following authentication, utilize the gear 1006 in assembly 1014 of gear train 1020 (e.g., may produce a system using gear 1006 and/or some other inducted components). Also, the gear train manufacturer may induct 1022 the gear train 1020 into the database system as part of a production process. The database system may store metadata in the record for the gear train 1020, such as information about an authorized user 1056 indicated by authentication credentials supplied in connection with the induction request, or other metadata for inventory notifications 1054 such as information about a time or other characteristic of the authenticated production of the gear train 1020.

For instance, the gear train manufacturer may perform any of the processes described with respect to FIGS. 7-9 in association with the gear train production, and may provide the gear train 1020 for shipping following authenticated production. The database system may link records, e.g., may link a record for the gear train 1020 to a record for the gear 1006 and any other inducted components from which gear train 1020 is assembled 1014.

The database system may be physically located in a different physical space than the physical space of security "wall" 1007. For instance, the database system may be located in a security "wall" 1040. Personnel given authorization to enter the gear train plant may not necessarily be given authorization to enter a data center of the database system.

Figure 11:
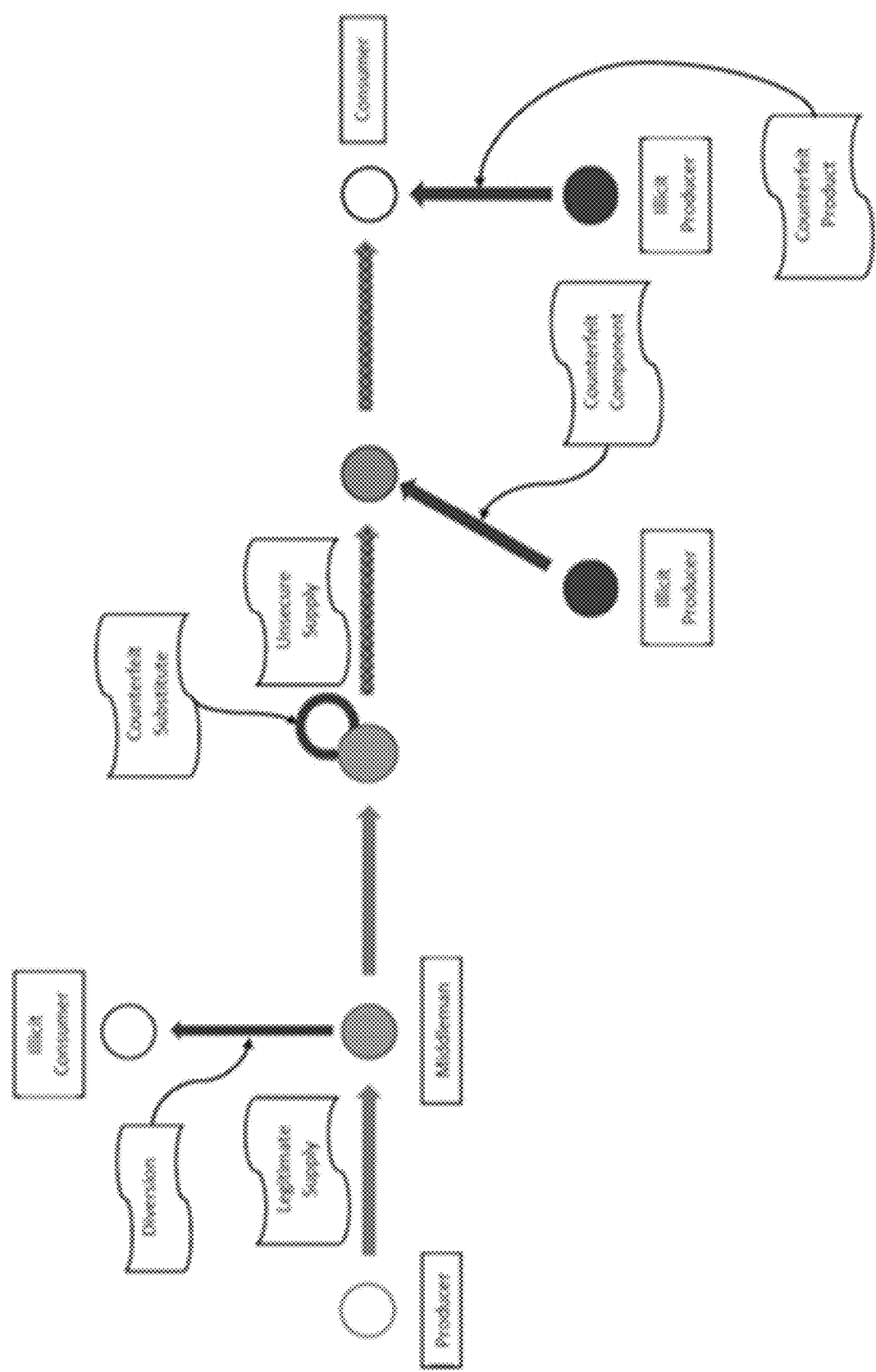
FIG. 11 and FIG. 12 illustrate illicit activity that may corrupt a supply chain.
Figure 12:
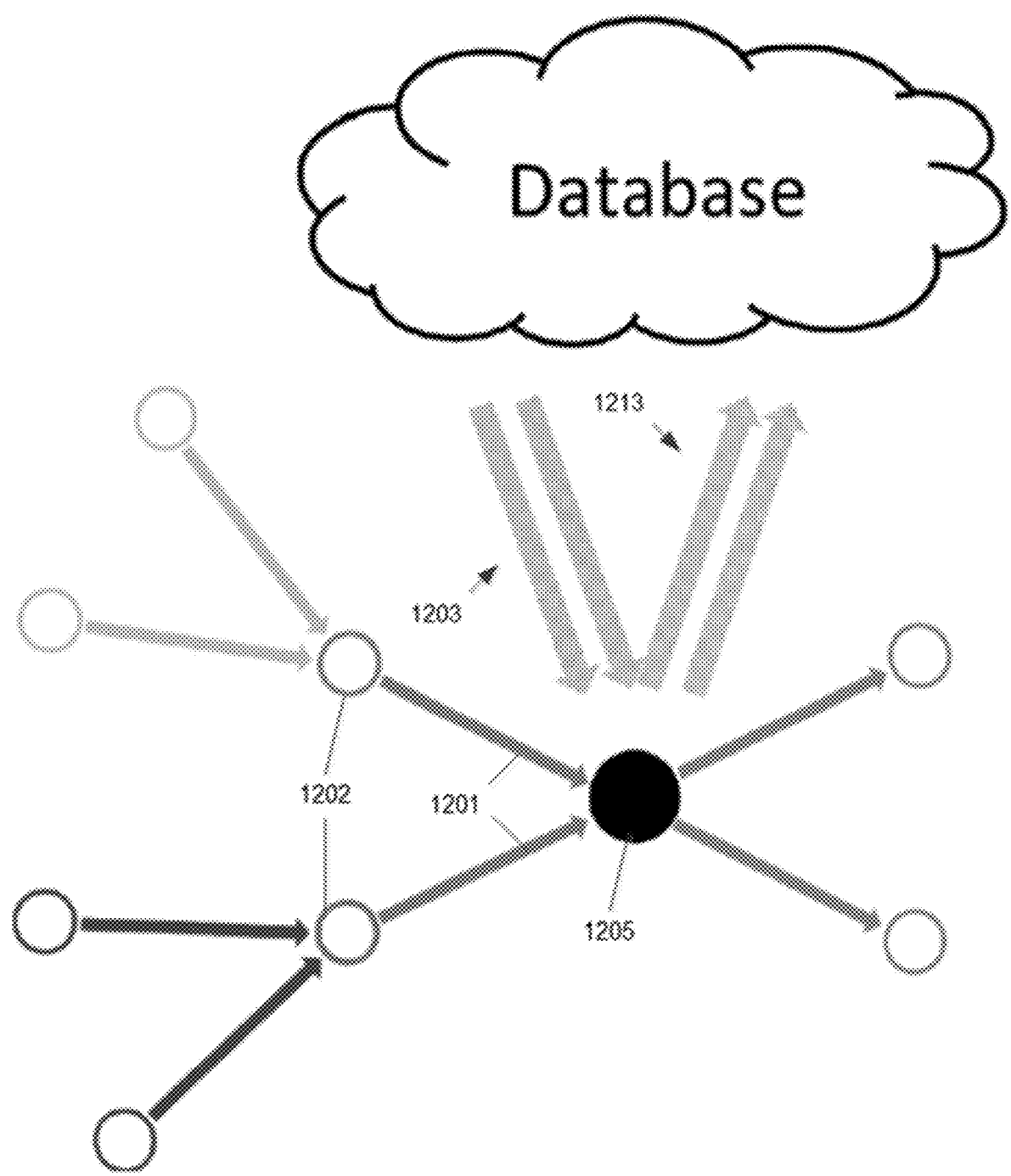

FIG. 11 and FIG. 12 illustrate illicit activity that can corrupt a supply chain. These two diagrams show in highly abbreviated form the illicit activity that can corrupt a supply chain (FIG. 11) and some ways the technology taught in our patent documents can ameliorate those problems. These diagrams are most useful where the authenticity of an object, rather than its specific identity is of greatest importance.

FIG. 11 shows four examples of illicit behavior. The first, on the far left, shows the diversion of a legitimate product for illicit use. Thus might a legitimate high-end handbag be diverted to a black-market customer. The second example shows a middleman, in the course of assembling a product, substituting an illicit component for an authorized one. An example of such illicit construction was the Continental Airlines cowling piece that, when it detached on takeoff, caused the destruction of the Concorde.

The third example shows a counterfeit component coming from a manufacturer and being added to the object. This is very similar to the previous example except for the external origin of the counterfeit and the possibility that, under the current system, the recipient may not know the component is counterfeit.

Finally, on the far right, we show the customer purchasing a counterfeit object unintentionally.

Nothing in our technology is designed to counter the problem of known knock-offs or known thefts, willingly purchased.

The very large, and rapidly growing, trade in counterfeits is proof of how difficult it is to guard against any of these illicit activities. Counterfeits get around current anti-counterfeiting methods either by being intentional internal fraud (the "homemade" component problem) or by mimicking legitimate objects well enough to fool the recipient.

The technology taught in our patent documents, when employed in a system such as the one outlined in FIG. 12 below, avoids each of these problems.

The authentication system taught in our patent documents can be applied to a supply chain to reduce or eliminate the risks of counterfeit objects entering into or legitimate objects being diverted from, the chain. FIG. 12 schematically represents the application of the taught technology at a location within a supply chain. The circle 1205 represents an intermediate stakeholder (neither a producer of raw materials nor an end-user).

The arrows 1201 show the stakeholder receiving components for his production. To ensure that the received components are legitimate, the stakeholder authenticates them as described below.

The stakeholder then produces his objects and inducts them into the database along with other required information so that they may later be authenticated by downstream stakeholders. He then ships them (arrows 1213) to his customers.

Authentication has several stages. Although seen from the point of view of any object in the system, induction precedes authentication, when seen from the perspective of an individual stakeholder, the opposite is the case. It is from that latter perspective that this diagram is discussed.

Not all objects need be authenticated. The database has previously been populated by an entity with a primary stake in the final object being legitimate. This may be the final recipient (in the case of contracted parts) or the brand holder (in the case of high-end consumer goods), or anyone else as appropriate. All objects required by the completed object that are sufficiently important to be authenticated are entered along with the identity of their authorized manufacturers.

Authentication. An object is received (the arrows 1201 coming from their circles 1202) by the stakeholder (here shown as circle 1205). An authentication query (not shown) is sent to the data store and authentication responses (shown as arrows 1203) received from the data store. If the object is authenticated, the object can be entered into the stakeholder's inventory and, if authentication-based purchase is in use (see the patent document on that subject), the payment process is begun. If the object is not authorized, it is rejected. No authentication is performed by suppliers that initiate the supply chain or on parts that are not required to be authenticated.

Authentication comprises the following steps:

Regions of interest are identified and fingerprint features created

Identifying information is captured or entered (e.g. serial number, part source) into a computer record coupled to the fingerprint features The above are sent to the data store along with information identifying the stakeholder The data store confirms that all of the following (where appropriate and required) are true:

The stakeholder has been authorized to authenticate objects

The identification data supplied for the object matches a database record.

Undetected Diversion of a Legitimate Object

Illicit Introduction of a Counterfeit.

If a part requires authentication and recipient attempts to authenticate it, a counterfeit part will not pass authentication and thus not enter the supply chain. In the event that the recipient fails to authenticate the object, his own products will fail of authentication by downstream stakeholders. Only an end-user who either intentionally receives a counterfeit object or who doesn't care is not protected.

Illicit Substitution.

If a legitimate manufacturer decides to cut corners and either purchase or himself produce a substitute for a part that requires authentication (what we have been calling "essential"), he cannot authenticate that part (since it did not come from a legitimate manufacturer who had previously inducted it and since he himself cannot induct it). As a result, the objects he produces using that part will not pass authentication by downstream stakeholders.

Diversion.

Each object that requires authentication has a database entry associated with its manufacturer and with its intended recipient. If the intended recipient never authenticates the object, then it can be presumed to have gone astray (either between the manufacturer and intended recipient or have been put to illicit use by the intended recipient).

- The fingerprint features, their arrangement, and all other required information matches the database record for the object. This establishes that the object is one that was entered into the database by a party authorized to do so.
- That manufacturer is confirmed by the data store as having shipped the object to the stakeholder and having authorized the stakeholder to authenticate the object
- All required inputs for the object were properly authenticated by their recipients (in other words the circles 1202 did previously what the circle 1205 is doing now) and inducted into the data store along with other required information.

In other words, an object is authentic when it is inducted into the database by its manufacturer. This can only happen when the manufacturer is authorized to manufacture the object and all of the object's (essential) components are authentic.

Once all the essential components have been authenticated (there may be components that do not require authentication), the stakeholder assembles them into his products. He then inducts his products into the data store. No induction is done by end-users or by middlemen whose products are not required to be authenticated.

Induction comprises the following steps:
- A serial number or other identifying information is created for the object.
- Object is imaged (or raw information is captured) and feature information extracted that, if confirmed, is sufficient to identify the object.
- A data store record is created containing the following information
    - Serial number or other identifying information
    - Fingerprint and template features of the object
    - Any required contextual and metadata including
        - Evidence that all essential components of the part have been authenticated
        - Intended recipient of the part
        - Authorization of that recipient to authenticate the part
        - Tracking and other metadata as required The above system addresses:
Introduction of a counterfeit part
Illicit substitution of a required part by a legitimate manufacturer who is cutting corners Example Embodiments Example 1 is a method of capturing an image as an integral part of the manufacturing process, of extracting a digital fingerprint from that image, of storing the digital fingerprint in a secure database for later use in authentication. The digital fingerprint data stored in the database may include contextual and metadata associated with the object. The object, through its digital fingerprint, may itself serve as a physical token to gain access to the additional associated digital data in the database. This could be done by imaging the object, extracting a digital fingerprint of the object, and using the extracted digital fingerprint to access the associated data. The "manufactured object" may be a document and the "manufacturing process" may include creating and authenticating a document on a printer also fitted for extracting a digital fingerprint of the created document. In this embodiment, the pages of a will might be digitally fingerprinted as the pages are printed, for later use in authentication of the originals.

Example A-1 is an apparatus for authenticated production. The apparatus may include one or more machines to produce or manufacture physical products or physical manufactures; a database system in communication with the one or more machines, the database system including a digital fingerprint processor configured to: identify an activation of at least one of the one or more machines to attempt to produce or manufacture at least one of the physical products or physical manufactures; responsive to completion of one or more operations associated with the activation by the one or more machines, acquire digital image data of a portion of a physical object proximate to the one or more machines; analyze the digital image data to form a digital fingerprint of the physical object, wherein the digital fingerprint is responsive to structure of the physical object; and store the digital fingerprint in a database record of the database system.

Example A-2 includes the subject matter of example A-1 (and/or any other example herein), wherein the digital fingerprint processor is further configured to: identify the completed production or manufacture of the at least one of the physical products or manufactures; and store information about a time or other characteristic of the completed production or manufacture in the database record.

Example A-3 includes the subject matter of any of examples A-2 through A-3 (and/or any other example herein), wherein the digital fingerprint comprises information about the physical object, and wherein the digital fingerprint processor is further configured to: obtain at least one of additional information about the physical object, information about the attempt, information about a state of the at least one machine, or information an operator of the at least one machine; and store the at least one of the additional information, the information about the attempt, the information about the state of the at least one machine, or the information about the operation of the at least one machine.

Example A-4 includes the subject matter of any of examples A-2 through A-3 (and/or any other example herein), wherein the additional information about the physical object comprises contextual and/or metadata associated with the physical object.

Example A-5 includes the subject matter of any of examples A-2 through A-4 (and/or any other example herein), wherein the additional information comprises a serial number or other value present in the digital image data.

Example A-6 includes the subject matter of any of examples A-2 through A-5 (and/or any other example herein), wherein the at least one machine comprises a fabrication device and the portion of the physical object comprises a completed surface.

Example A-7 includes the subject matter of any of examples A-2 through A-6 (and/or any other example herein), wherein the portion of the physical object comprises a surface to be accessible on completion of at least one of the physical products or physical manufactures.

Example A-8 includes the subject matter of any of examples A-2 through A-7 (and/or any other example herein), wherein the at least one of the physical products or physical manufactures comprises a system including a first component and a second component, and wherein said physical object comprises the first component.

Example A-9 includes the subject matter of any of examples A-2 through A-8 (and/or any other example herein), wherein the component of the plurality of components comprises a first component, and wherein the digital fingerprint processor is further configured to: acquire additional digital image data of a portion of the second component; analyze the additional digital image data to form a digital fingerprint of the second component, wherein the digital fingerprint is responsive to structure of the second component; and store the digital fingerprint of the second component in the same or another database record of the database system.

Example A-10 includes the subject matter of any of examples A-2 through A-9 (and/or any other example herein), wherein the digital fingerprint processor is further configured to transmit a control signal to the at least one machine to prevent the attempt to produce or manufacture the at least one of the physical products or physical manufactures from completing based on content of the digital image data.

Example A-11 is method of authenticated production using one or more machines to produce or manufacture physical products or manufactures. The method may include identifying an activation of at least one machine of the one or more machines to attempt to produce or manufacture at least one of the physical products or physical manufactures; responsive to completion of one or more operations associated with the activation by the one or more machines, acquiring digital image data of a portion of a physical object on or inside the one or more machines; analyzing the image data to form a digital fingerprint of the physical object, wherein the digital fingerprint is responsive to structure of the physical object; and storing the digital fingerprint in a database record of a database system.

Example A-12 includes the subject matter of example A-11 (and/or any other example herein), wherein the physical object comprises a component of the at least one of the physical products or physical manufactures.

Example A-13 includes the subject matter of any of examples A-11 through A-12 (and/or any other example herein), further comprising completing or manufacturing the at least one of the physical products or physical manufactures following the acquisition of the digital image data.

Example A-14 includes the subject matter of any of examples A-11 through A-13 (and/or any other example herein), wherein the record comprises a new record created responsive to forming the digital fingerprint of the physical object.

Example A-15 includes the subject matter of any of examples A-11 through A-14 (and/or any other example herein), further comprising preventing the at least one machine from producing or manufacturing the least one of the physical products or physical manufactures responsive to a result of the analysis of the digital image data.

Example A-16 includes the subject matter of any of examples A-11 through A-15 (and/or any other example herein), wherein the physical products or manufactures comprises printed documents.

Example A-17 includes the subject matter of any of examples A-11 through A-16 (and/or any other example herein), further comprising: subsequent to storing the digital fingerprint in the database record, identifying information corresponding to a target physical object, wherein identifying the first information corresponding to the target physical object includes acquiring second digital image data of a portion of the target physical object; extracting features from the second digital image data to form a second digital fingerprint; querying the database system to seek a matching record based on the second digital fingerprint; and in the case that a matching record is returned responsive to the querying, updating the matching record with an indication that the second digital fingerprint was matched to it.

Example A-18 includes the subject matter of any of examples A-11 through A-17 (and/or any other example herein), wherein the at least one machine comprises a fabrication device and the portion of the physical object comprises a completed surface.

Example A-19 includes the subject matter of any of examples A-11 through A-18 (and/or any other example herein), wherein the fabrication device comprises at least one of a three-dimension printer or a document printer.

Example A-20 is an apparatus for authenticated production. The apparatus may include one or more machines to produce or manufacture physical products or physical manufactures, the one or more machines including a processor configured to: identify an activation of at least one of the one or more machines to attempt to produce or manufacture at least one of the physical products or physical manufactures; and ascertain whether to permit the one or more machines to produce or manufacture the at least one of the physical products or physical manufactures; and a database system in communication with the first processor, the database system including a second digital fingerprint processor configured to: identify information about the attempt; signal the first processor if the attempt is not authorized based on the identified information about the attempt; responsive to completion of one or more operations associated with the activation by the one or more machines, analyze digital image data of a portion of a physical object on or inside the one or more machines to form a digital fingerprint of the physical object, wherein the digital fingerprint is responsive to structure of the physical object; and store the digital fingerprint in a database record of the database system.

Example A-21 is a method of authenticated production using one or more machines to produce or manufacture systems, the method comprising: identifying an activation of at least one machine of the one or more machines to attempt to produce or manufacture at least one of the systems using one or more parts; wherein the one or more parts are inducted into a database system, and wherein the database system includes a first database record including one or more digital fingerprints of the one or more parts, respectively; responsive to completion of one or more operations associated with the activation by the one or more machines, acquiring digital image data of a portion of a physical object associated with the system, the physical object having the one or more parts coupled thereto; analyzing the image data to form a digital fingerprint of the physical object, wherein the digital fingerprint is responsive to structure of the physical object; and performing at least one of storing the digital fingerprint in the first database record or storing the digital fingering in a second database record that is of the database system and linked to the first database record.

Example A-22 includes the subject matter of example A-21 (and/or any other example herein), further comprising: identifying an activation of the one or more machines to attempt to produce or manufacture at least one of the one or more parts; responsive to completion of one or more operations associated with the activation to attempt to produce or manufacture the at least one of the one or more parts, acquiring digital image data of a portion of a physical object associated with the at least one of the one or more parts;

analyzing the image data to form a digital fingerprint of the physical object associated with the at least one of the one or more parts, wherein the digital fingerprint is responsive to structure of the physical object associated with the at least one of the one or more parts; and storing the digital fingerprint in the first database record of the database system.

Example A-23 includes the subject matter of any of examples A-21 through A-22 (and/or any other example herein), wherein the system comprises a computer, and the one or more parts comprise at least one of a circuit board, a drive, or a chip.

Example A-25 includes the subject matter of any of examples A-21 through A-24 (and/or any other example herein), further comprising: storing first metadata associated with the production or manufacture of the one or more parts in the first record; and storing second metadata associated with the production or manufacture of the at least one of the systems in at least one of the first database record or the second database record that is linked to the first database record.

Example A-26 includes the subject matter of any of examples A-21 through A-25 (and/or any other example herein), wherein the first metadata identifies a relative physical location of each one or more parts relative to the at least one system for authenticating the at least one system based an arrangement of the one or more parts.

Example A-27 is one or more memory storing instructions to be executed by one or more processors, wherein the instructions when executed perform operations corresponding to the steps of any of the examples A-11 through A-19 and A-21 through A-26 (and/or any other example herein).

Hardware and Associated Software

Most of the equipment discussed above comprises hardware and associated software. For example, the typical electronic device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. An apparatus, comprising:
a secure physical workspace to which access is controlled;
one or more machines provisioned inside the workspace to produce or manufacture physical products;
a database system in communication with the one or more machines, the database system including a digital fingerprint processor configured to:
attempt to authenticate a plurality of components received in the secure physical workspace;
reject the received components in response to determining the received components are not authorized based on the attempt to authenticate;
identify an activation of at least one of the one or more machines to produce or manufacture a physical product that incorporates the received components, in response to determining the received components are authorized based on the attempt to authenticate;
responsive to completion of one or more operations associated with the activation of the one or more machines, acquire digital image data of a portion of the physical product produced or manufactured by the completed operations;
analyze the digital image data to form a digital fingerprint of the physical product, wherein analyzing the digital image data includes extracting a least one location of interest in the image data, the location of interest based on the image data rather than selected at random, generating feature vectors based on the at least one location of interest, and using the feature vectors to form the digital fingerprint; and
store the digital fingerprint in a database record of the database system together with or linked to metadata related to production of the physical product.

2. The apparatus of claim 1, wherein the digital fingerprint processor is further configured to:
identify the completed production or manufacture of the at least one of the physical products; and store information about a time or other characteristic of the completed production or manufacture in the database record.

3. The apparatus of claim 1, wherein the digital fingerprint comprises information about the physical product, and wherein the digital fingerprint processor is further configured to:
obtain at least one of additional information about the physical product, information about a state of the at least one machine, or information an operator of the at least one machine; and
store in or link to the database record the at least one of the additional information, the information about the attempt, the information about the state of the at least one machine, or the information about the operation of the at least one machine.

4. The apparatus of claim 3, wherein the additional information about the physical product comprises contextual and/or metadata associated with the physical product.

5. The apparatus of claim 4, wherein the additional information comprises a serial number or other value present in the digital image data.

6. The apparatus of claim 1, wherein the at least one machine comprises a fabrication device and the portion of the physical product comprises a completed surface.

7. The apparatus of claim 1, wherein the portion of the physical product comprises a surface to be accessible on completion of at least one of the physical products.

8. The apparatus of claim 1, wherein the digital fingerprint processor is further configured to determine from the acquired digital image data a physical relationship between two of the components incorporated into the product and storing data in the digital fingerprint of the product based on the physical relationship.

9. A method of authenticated production comprising:
establishing a physical space to which access is controlled by a manufacturer;
provisioning a machine inside the controlled physical space;
receiving plural components into the controlled physical space;
attempting to authenticate each of the received components;
conditioned on determining that all of the received components have been successfully authenticated, activating the machine to assemble or manufacture a product that incorporates the authenticated components;
conditioned on determining at least one of the received components has not been successfully authenticated, rejecting a command to activate the machine;
responsive to completion by the machine of one or more operations associated with the activation, inside the controlled physical space, and before the product exits the controlled physical space, acquiring digital image data of a portion of the physical product;
analyzing the digital image data to form a digital fingerprint of the product, wherein analyzing the digital image data includes extracting a least one location of interest in the image data, the location of interest based on the image data rather than selected at random, generating feature vectors based on the at least one location of interest, and using the feature vectors to form the digital fingerprint;
storing the digital fingerprint in a database record of a database system and
adding or linking to the stored digital fingerprint record digital fingerprint authentication data for each of the authenticated components incorporated into the product.

10. The method of claim 9, further comprising:
subsequent to storing the digital fingerprint in the database record, identifying information corresponding to a target physical object, wherein identifying the information corresponding to the target physical object includes acquiring second digital image data of a portion of the target physical object;
extracting features from the second digital image data to form a second digital fingerprint;
querying the database system to seek a matching record based on the second digital fingerprint; and
in the case that a matching record is returned responsive to the querying, updating the matching record with an indication that the second digital fingerprint was matched to it.

11. The method of claim 9, wherein the machine comprises a fabrication device and the portion of the product comprises a completed surface.

12. The method of claim 11, wherein the fabrication device comprises at least one of a three-dimension printer or a document printer.

13. The method of claim 9 wherein authenticating the received components comprises:
imaging each of the received components to form a corresponding image; transmitting each of the corresponding images to an authentication process;
receiving from the authentication process a confirmation that each of the received components matches a component previously inducted into a digital fingerprint authentication database.

14. The method of claim 13 wherein the authentication process analyzes each received image so as to form a digital fingerprint of the corresponding component, wherein analyzing the image data includes extracting a least one location of interest in the image, the location of interest based on the image rather than selected at random, generating feature vectors based on the at least one location of interest, and using the feature vectors to form the digital fingerprint.

15. The method of claim 13 wherein the digital fingerprint authentication database is coupled to a secure component manufacturer to acquire digital fingerprints of components made by the secure component manufacturer.

16. The method of claim 13 including adding or linking to the stored digital fingerprint record metadata that identifies the manufacturer and a date-time stamp of when the digital image data of a portion of the product was acquired.

17. The method of claim 13 including updating the digital fingerprint authentication database records of the received components with metadata to reflect incorporation of the received components into the product.

18. An apparatus, comprising:
a physical workspace to which access is controlled by a manufacturer;
one or more machines disposed inside the controlled physical workspace and arranged to assemble or manufacture products, the one or more machines including a processor configured to:
identify an activation of at least one of the one or more machines to attempt to produce assemble or manufacture at least one of the product; and
ascertain whether to permit the activated one or more machines to assemble or manufacture the at least one product;

wherein ascertaining whether to permit the assembly or manufacture requires—
  identifying specific components to be incorporated into the product by the activated machine(s);
  attempting to authenticate each of the identified components; and
  permitting the activated at least one of the one or more machines to assemble or manufacture the product only if each of the identified components has been successfully authenticated; and
  preventing the one or more machines from assembling or manufacturing the product if each of the identified components has not been successfully authenticated;
a database system in communication with the first processor, the database system including a second digital fingerprint processor configured to:
responsive to completion of one or more operations associated with the activation by the one or more machines, analyze digital image data of a portion of a physical object on or inside the one or more machines to form a digital fingerprint of the physical object, wherein analyzing the digital image data includes extracting a least one location of interest in the image data, the location of interest based on the image data rather than selected at random, generating feature vectors based on the at least one location of interest, and using the feature vectors to form the digital fingerprint;
store the digital fingerprint in a database record of the database system; and
add or link to the stored digital fingerprint record, digital fingerprint authentication data for each of the authenticated components incorporated in the product.

19. A method of authenticated production using one or more machines to produce or manufacture systems, the method comprising:
  establishing a physical space to which access is controlled by a manufacturer;
  installing the one or more machines inside the physical space so as to control access to the one or more machines;
  attempting to produce or manufacture a system incorporating one or more parts;
  wherein each of the one or more parts were previously inducted into a database system, and wherein the database system includes a first database record including one or more digital fingerprints of each of the one or more parts, respectively;
  querying the database system to locate the first database record;
  determining if the one or more parts are authorized based on the first database record;
  in response to determining the one or more parts are not authorized, rejecting the one or more parts and refusing to accept the one or more parts into inventory;
  in response to determining the one or more parts are authorized, identifying an activation of at least one machine of the one or more machines to produce the system incorporating the one or more parts:
  during completion of one or more operations associated with the activation by the one or more machines and prior to manufacturing a complete physical object, acquiring digital image data of a portion of a physical object associated with the system, the physical object having the one or more parts coupled thereto, before the physical object exits the physical space;
  analyzing the image data to form a digital fingerprint of the physical object, wherein analyzing the digital image data includes extracting a least one location of interest in the image data, the location of interest based on the image data rather than selected at random, generating feature vectors based on the at least one location of interest, and using the feature vectors to form the digital fingerprint; and
  performing at least one of storing the digital fingerprint in the first database record or storing the digital fingering in a second database record that is of the database system and linked to the first database record.

20. The method of claim 19, further comprising:
identifying an activation of at least one machine of the one or more machines to attempt to produce or manufacture at least one of the one or more parts;
responsive to completion of one or more operations associated with the activation to attempt to produce or manufacture the at least one of the one more parts, acquiring digital image data of a portion of a physical object associated with the at least one of the one or more parts;
analyzing the image data to form a digital fingerprint of the physical object associated with the at least one of the one or more parts, wherein the digital fingerprint is responsive to structure of the physical object associated with the at least one of the one or more parts; and
storing the digital fingerprint in the first database record of the database system.

21. The method of claim 19, wherein the system comprises a computer, and the one or more parts comprise at least one of a circuit board, a drive, or a chip.

22. The method of claim 19, further comprising: storing first metadata associated with the production or manufacture of the one or more parts in the first record; and storing second metadata associated with the production or manufacture of the at least one of the systems in at least one of the first database record or the second database record that is linked to the first database record.

23. The method of claim 22, wherein the first metadata identifies a relative physical location of each one or more parts relative to the at least one system for authenticating the at least one system based an arrangement of the one or more parts.

* * * * *